(12) United States Patent
Duggan

(10) Patent No.: US 7,832,742 B1
(45) Date of Patent: Nov. 16, 2010

(54) ERGONOMICALLY ADVANCED ROTATING BOOT AND FOOT MOUNTING SYSTEM FOR SPORTBOARDS

(76) Inventor: John C. Duggan, 32 Sharon Dr., Tonawanda, NY (US) 14150

(*) Notice: Subject to any disclaimer, the term of this patent is extended or adjusted under 35 U.S.C. 154(b) by 396 days.

(21) Appl. No.: 12/070,081

(22) Filed: Feb. 15, 2008

(51) Int. Cl.
*A63C 9/08* (2006.01)
*A63C 9/00* (2006.01)

(52) U.S. Cl. .............. 280/14.24; 280/607; 280/613; 280/618; 280/620; 280/629; 280/14.23

(58) Field of Classification Search ............... 280/607, 280/11.14, 11.31, 613, 618, 620, 628, 629, 280/14.22, 14.24, 14.23
See application file for complete search history.

(56) References Cited

U.S. PATENT DOCUMENTS

| | | | |
|---|---|---|---|
| 4,007,946 A * | 2/1977 | Sarver | 280/600 |
| 4,085,947 A * | 4/1978 | Sarver | 280/607 |
| 5,188,386 A * | 2/1993 | Schweizer | 280/607 |
| 5,671,939 A * | 9/1997 | Pineau | 280/602 |
| 5,971,419 A | 10/1999 | Knapschafer | |
| 6,022,040 A | 2/2000 | Buzbee | |
| 6,209,229 B1 | 4/2001 | Bourdeau | |
| 6,257,614 B1 * | 7/2001 | Duggan | 280/618 |
| 6,296,258 B2 | 10/2001 | Higgins et al. | |
| 6,382,658 B1 | 5/2002 | Stubblefield | |
| 6,394,483 B2 | 5/2002 | Stubblefield | |
| 6,491,310 B1 | 12/2002 | Work | |
| 6,499,758 B1 | 12/2002 | Fournier | |
| 6,505,841 B1 | 1/2003 | Kessler et al. | |
| 6,663,118 B1 | 12/2003 | Otsuji et al. | |
| 7,059,614 B2 | 6/2006 | Cole, III et al. | |
| 7,097,195 B2 | 8/2006 | Orr et al. | |
| 2003/0094777 A1* | 5/2003 | Fournier | 280/14.22 |
| 2003/0146588 A1 | 8/2003 | Fiebing | |
| 2004/0100069 A1* | 5/2004 | Cumby | 280/618 |
| 2005/0029757 A1* | 2/2005 | Fiebing | 280/14.24 |
| 2007/0013165 A1* | 1/2007 | Panzeri | 280/618 |

FOREIGN PATENT DOCUMENTS

DE 202 20 683 U1 2/2004

* cited by examiner

*Primary Examiner*—J. Allen Shriver, II
*Assistant Examiner*—John R Olszewski

(57) ABSTRACT

One embodiment of a foot or boot mounting for a sportboard such as a snowboard, wakeboard, mountainboard, surfboard, kiteboard, or similar article, having a tilted base plate (72) with a bearing raceway (73B) or other means providing an axis of rotation that is inclined by a predetermined angular amount ($\alpha$), pivotably guiding a tilted rotating plate (86) that has a top surface (87T) tilted with respect to its axis of rotation by a predetermined angular amount ($\phi$). Top surface (87T) provides direct or indirect support for the bottom surface of a rider's foot. The tilt of top surface (87T) is aligned relative to its axis of rotation such that the upward tilted portion is generally aligned toward the inside of a rider's foot. Thus, a rider's feet and body members are aligned more naturally while the rider is free to continually rotate his or her feet and change posture more comfortably.

16 Claims, 21 Drawing Sheets

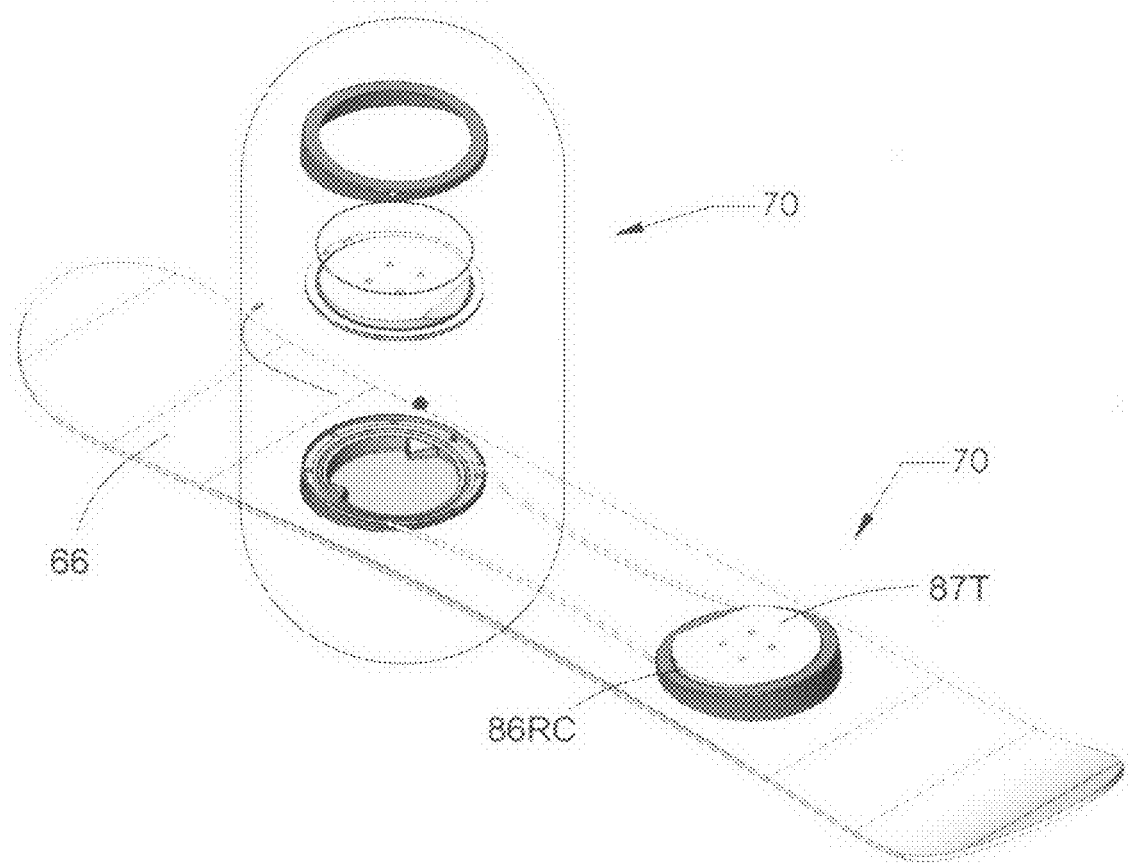

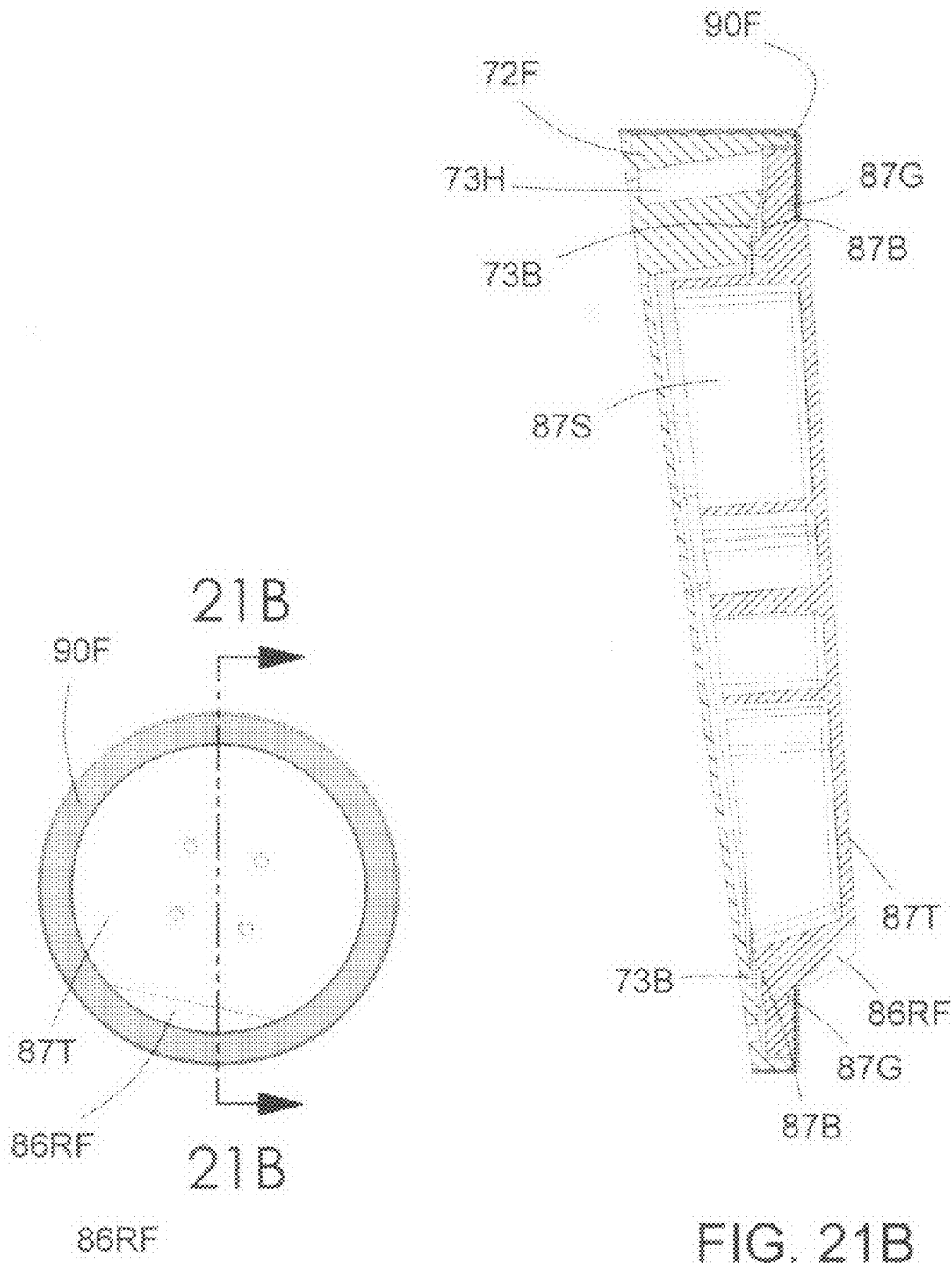

ERGONOMICALLY ADVANCED ROTATING BOOT AND FOOT MOUNTING SYSTEM FOR SPORTBOARDS

CROSS REFERENCE TO RELATED APPLICATIONS

Certain embodiments disclosed in this application also utilize the technology disclosed in my U.S. Pat. No. 6,257,614 B1, granted 10 Jul. 2001, which is incorporated by reference.

FEDERALLY SPONSORED RESEARCH

Not Applicable

SEQUENCE LISTING OR PROGRAM

Not Applicable

BACKGROUND

1. Field of Invention

The present invention relates generally to sportboard boot binding and foot-retaining mechanisms. More particularly, the present application involves a type of binding system that allows rotational movement of a rider's feet during operation with improved ergonomics.

2. Prior Art

Prior Art—General

The use of sportboards (a.k.a. sportingboards, sportboards) such as snowboards, wakeboards, kiteboards, airboards, sand-boards, and mountain-boards, etc., has become more popular in recent years. Snowboarding for example, has become a very well developed sport having a large number of enthusiasts. This increase in popularity caused it to become part of the Olympic Games in 1998. Such popularity also has led to the rise of numerous manufacturers and the availability of well developed product lines.

There are many types of sportboards and snowboards. However, snowboard types can be classified roughly into two types: the carving (a.k.a. race) and the more common "symmetrical" (a.k.a. freeride and freestyle) types. There are differences between the freeride and freestyle types. The freestyle type boards are generally more dimensionally symmetrical, such as the twin tip freestyle board. The carving board is essentially non-symmetrical and has one upwardly curved end. Thus the carving board is designed to travel primarily in one direction relative to the longitudinal axis of the board. An example of a carving board is the Giant Slalom (GS) type board. Symmetrical boards have similarly shaped ends, i.e., both ends are upwardly curved. Thus the symmetrical board is therefore better suited to reverse direction of travel. An example of symmetrical type boards are those that are used in all mountain and half-pipe events.

Prior Art—Fixed (Non-Rotating) Bindings

Most foot or boot bindings currently in use are 'fixed', i.e., do not change rotational orientation relative to the snowboard readily during riding. The rotational orientation of the foot and binding is generally in reference to a virtual (a.k.a. imaginary) axis located essentially through the center of a rider's foot (or binding) that is perpendicular to the bottom surface of the sportboard. Yet, for different events, snowboard riders have different favored angular positions of their feet relative to the longitudinal axis of the snowboard. Such positions enable riders to accommodate different snow conditions or snowboarding styles. Some preferred riding positions have toes pointed more toward the side of the board, some toward an end (curved tip) of the board. For instance, during speed runs such as the Giant Slalom, the typical snowboarder orients the toes of his or her feet more toward the direction of travel. Thus, the toes of the rider's feet are more in line with the longitudinal axis of the snowboard. This works well since the GS boards are typically operated in only one direction.

For other riding such as freestyle and half-pipe events, the desired toe angle is oriented more perpendicular to the board's longitudinal axis. This enables a rider to ride a snowboard oriented with either end of the sportboard pointed in the direction of travel. However, essentially every rider has a preferred foot stance relative to an end of a snowboard most favored for the direction of travel. The preferred foot stance is cooperative commensurate with the favored direction of travel. Thus, the toes of the leading foot (relative to direction of travel) of a rider are more forward oriented toward the favored direction of travel. These predominant riding positions are commonly referred to as "regular" or "goofy."

This latter type of riding using a more symmetrically curved snowboard has become very popular. Yet, an inherent flaw exists with riding such sportboards using the typical fixed (non-rotating) bindings. The favored stance (goofy or regular) of a rider is really that with which the rider intrinsically has more skill. This skill is reinforced since most riding is, done with the preferred board end (tip) pointed toward the direction of travel. However, when riding a symmetrical board backward (a.k.a. fakie or switchstance) with fixed bindings, the rider typically is compromised in two ways:

a) the rider's toes (and therefore body posture) are oriented away from (or at least less-toward) the 'backwards' direction of travel, and, b) the rider also has less skill in her or his less-preferred direction of travel.

Prior Art—Rotatable Bindings

It can be further argued that the more perpendicularly oriented (common, fixed) foot stance is intrinsically compromised for the favored direction of travel. Ideally, the feet should be angled more toward the direction of travel, as with a GS type board. Thus, the feet should be able to be oriented more toward the ends of the symmetrical board. Yet other, different sportboard maneuvers would have better results with the rider's feet oriented within the range between end positions. Certain advances have been made to create bindings to solve this problem. A variety of rotatable bindings that more easily rotate about a vertical axis (essentially perpendicular to the sportboard) and lock into fixed, user selectable positions are known. In general, these are an improvement over bindings requiring disassembly to make an adjustment, but do not address the problem well. However, rotatable bindings that are free to continuously rotate while riding are a further, more recent advancement. Bindings that freely rotate during operation are of more particular interest regarding this present application. Additionally of interest are those developments in foot and boot bindings that address ergonomic concerns and human factors for sportboards.

Prior Art—Boot Designs

In general, attempts have been made to address the difficulties of providing a comfortable connection between the human foot and leg to a sportboard. The connection has to have two seemingly conflicting qualities. 1) Soft padding is required for foot and leg comfort, and, 2) Rigidity is necessary for ankle support and to impart control forces to direct the sportboard. GS type boots are similar to ski boots with a rigid outer shell and soft liner, providing substantial ankle support. These boots typically have a hinge type mechanism that allows the ankle limited flexure. This mechanism basically enables the lower leg to pivot essentially toward and away from the toes about the ankle joint. Since the GS type board is more dedicated to one direction of travel, it works well with a more rigid boot.

Snowboard boots used with symmetrical type boards most often do not have a hard plastic shell. These "soft boots" used are akin to a snow pack boot, yet are more rigid. Boots used with symmetrical boards are required to provide lower leg support yet be flexible. This support is required to control the board as well as limit rider fatigue. Riders on symmetrical boards do reverse direction of travel, and often perform many trick maneuvers. Riders also perform maneuvers in a half-pipe or in terrain parks that have obstacles. Such riding requires changing body posture as well as lower leg positions. Often such a rider rotates his or her torso (and therefore her or his hips) about a roughly vertical axis throughout a riding session. In doing so, a symmetrical board rider alternates between facing somewhat toward each of the opposite ends of the sportboard. The rider's lower legs accommodate such movement as much as possible. Thus, soft boots used with symmetrical type boards need to provide support, have flexibility, and be comfortable. Additionally, various binding and sportboard designs have attempted to address these and other human-sportboard ergonomic challenges.

Prior Art—Ergonomics & Human Factors

Regardless of foot positional preference relative to the ends of the snowboard, essentially all riders share a common trait. The typical snowboarders stance places foot centers approx. shoulder width apart. This is done for stability and is comparable in some ways to that of participants in wrestling, martial arts, baseball, etc. Yet, to engage and follow the typical flat binding on an essentially flat sportboard, the feet and/or boot bottoms are tilted with respect to the lower leg. This is a less than optimal result of employing a wider stance. Since soft type boots have some ankle support, yet are somewhat flexible, a comfort level is reached. But the leg is a structural unit of the human skeleton under load. It is arguably more stable, comfortable, and stronger-if the foot bottom remains essentially perpendicular to an axis that passes through the central foot region and hip joint of the same leg. The dynamics of a rider's skeletal system utilizing free foot rotation while riding a sportboard make this difficult to achieve.

In particular, the twisting of the torso with hips creates a challenge in maintaining the bottom of a rider's foot essentially perpendicular to the respective axis formed by the central foot region to hip joint. Evidently, the particulars of this need have not been accurately recognized in the prior art. The dynamics of a rider's orthopedic structure will be further addressed subsequently in both the drawings and the text of this present application. Some prior art designs have attempted to address the ergonomics of foot and/or leg to sportboard relationship. Nevertheless, up until now, no designs have successfully addressed both of the aforementioned significant needs. That is, the need to: 1) allow a rider to rotate his or her feet while riding, and also, 2) maintain the bottoms of a rider's feet essentially perpendicular to the axes that pass through the respective central foot regions and hip joints. In short, the prior art that is of greater interest to this present application is:

Sportboard bindings that are free to rotate about an essentially vertical axis, and, Ergonomic improvements in the leg-to-foot-to-sportboard connection.

Prior Art—Patents & Patent Application Publications

U.S. Pat. No. 5,971,419 to M. L. Knapschafer introduces a binding system that uses hard shell type boots that are free to pivot via a horizontal pin on a free style snowboard. The horizontal pin runs basically from under the heel portion of the boot to the toe portion of the boot. By pivoting about a horizontal axis, the boots are free to swivel through a side to side arc in respective vertical planes. The support from a more rigid boot is utilized for ankle stability. The required lower leg flexibility is thus provided via the axis of the horizontal pin. However, that particular flexibility is limited to the (respective) aforementioned vertical planes. Flexibility outside of that plane is limited to that which is typical of hard shell boots. Additionally, the binding embodiment(s) disclosed are not free to rotate about a vertical axis while riding. Thus, the benefits of operating a sportboard having continuously-variable-rotation bindings are not obtained.

If redesigned to have such rotational capability, it would seem the embodiment(s) disclosed in U.S. Pat. No. 5,971,419/Knapschafer would improve in performance. However, movement is restricted by the hard shell boot in the plane established by the leg and the horizontal pin. This rigidity is used to control the sportboard via tilting about the longitudinal axis of the board. This is done essentially by a rider shifting her or his weight and by tilting the leg(s) frontward or backward. Yet this designed in restriction of ankle movement in the plane shared by the leg & horizontal pin becomes more problematic if used in rotating binding designs. As mentioned earlier, there is a need to maintain a rider's foot relatively normal to the respective central foot region-hip axis. This also is not satisfied. Thus, the embodiment(s) disclosed in U.S. Pat. No. 5,971,419/Knapschafer does (do) not address the aforementioned needs, even if it were made to be dynamic.

U.S. Pat. No. 6,022,040 to D. C. Buzbee introduces a binding system that allows a rider to rotate her or his feet while riding. The embodiment(s) disclosed have several advantages working for it (them). The design is simple, which is generally good from the standpoint of manufacturability and reliability. It is a step-in binding, which affords convenience to the rider. It does allow foot rotation for the rider during usage, albeit such rotation is limited to 'riding when not turning'. From the text regarding FIG. 5 of the U.S. Pat. No. 6,022,040 (column 6, line 52):

"Friction occurs between the bottom of boot 20 and the upper surface of snowboard 18. Friction is also created by the interlocking of radial ridges 28 on catch structure flanges 27 and binding base flanges 23. This resists rotation movement of the feet and enables the snowboarder to control the snowboard. When the snowboarder is standing upright, e.g. in the lift line or traveling straight, the boot may be raised just enough from the snowboard to allow the rotation of the foot."

Thus, if riding down a hill in continuous 'S' turns, the rider can change foot positions essentially at the 'inflection points' (transition zones) between turns. So this binding is not continuously free to rotate during usage. This deprives the operator of the ability to execute a whole class of maneuvers that require freedom to rotate a rider's feet continuously, at will.

It can also be argued that, as a step-in binding, the rigidity afforded by the embodiment(s) of U.S. Pat. No. 6,022,040/Buzbee is less than high back type binding systems. It has been argued in general that, compared to 'external frame' type systems, i.e., the typical high back binding, 'internally structured' type step-in systems afford a less rigid connection to a snowboard. The embodiment(s) of U.S. Pat. No. 6,022,040 also intrinsically have a tolerance zone (a.k.a. 'play') to clear the interlocking of radial ridges 28 of the flanges. Thus, the response of the sport board is compromised by the tolerance, even if the necessary support was otherwise provided by the boots. Additionally, the embodiment(s) of U.S. Pat. No. 6,022,040 does (do) not maintain the feet bottoms relatively normal to the respective axes passing through the hips and central foot regions throughout the range of operation.

U.S. Pat. No. 6,209,229 to J. Bourdeau introduces a freeride or freestyle boot with reinforcing structural elements. The boot combines certain support properties of hard shell boots with those of soft shell boots, albeit in a unique way. The language in the Abstract of U.S. Pat. No. 6,209,229 includes:

"a relatively flexible upper, mainly forming the outer portion of the boot connected to the sole, a rigid shell at least partially covering the sole and extending upwardly at the rear of the boot, at the level of the heel, and a rigid back portion journalled on the shell and extending it upwardly."

The journalled feature establishes an axis, which combined with physical properties and geometry, allows a rider's lower legs to pivot somewhat forward and backward, but also somewhat toward and away from each other. This journalled feature(s) is located near the respective ankle joint(s) of the boot. Thus, U.S. Pat. No. 6,209,229/Bourdeau provides support and, as does 5,971,419/Knapschafer, means to pivot. However, the 'side to side' axes are located differently: U.S. Pat. No. 5,971,419/Knapschafer is below the foot of the rider; U.S. Pat. No. 6,209,229/Bourdeau is essentially at the ankle. The 'fore to aft' (toward and away from toes) axis of both are essentially located at the ankle. This is evident from the application of U.S. Pat. No. 6,209,229, and typical for hard shell boot construction. Therefore, the embodiment(s) of U.S. Pat. No. 6,209,229 may provide other benefits but does (do) not address the two aforementioned challenges:

It does not provide continuously variable foot rotation about a vertical axis, and, Does not maintain the bottom of the rider's foot essentially perpendicular to the axis formed by the respective central foot region and hip joint.

U.S. Pat. No. 6,257,614 B1 to J. Duggan (current applicant) provides a foot binding system that allows dynamic foot rotation essentially about respective vertical axes while riding the sportboard. A rider's feet are free to rotate cooperatively; the foot bindings are connected by a means that insures simultaneous rotation. This makes available the advantages of riding goofy then switching to regular and all positions in between. By establishing cooperative positioning, the burden of coordinating the rotational positions of both feet relative to each other and the sportboard is removed. The sportboard is thus easier to control while riding at higher speeds, over rough terrain, and when executing other maneuvers. For example, the bindings can be continuously rotated throughout turns, straight travel, while airborne, etc. However, the embodiment(s) of U.S. Pat. No. 6,257,614 B1/Duggan can also be further improved with regard to the foot bottom position relative to the respective central foot region-hip axis. This will become evident with a review of the embodiments introduced as the subject of this present application.

U.S. Pat. No. 6,296,258 B2 to M. T. Higgins & R. J. Caputo introduces a binding system that has shock absorbing properties produced via springs. The embodiment(s) disclosed also allow slight rotation of a rider's foot about an axis or axes that are vertical or nearly vertical while riding. The binding system introduced by U.S. Pat. No. 6,296,258 B2/Higgins & Caputo also allows the bottom of a rider's foot to tilt or become essentially perpendicular to the axis formed by the respective central foot region and hip joint. However, the freedom of foot rotation about a vertical (or nearly vertical) axis is restricted to a very small arc sector. This sector is limited by displacement of the springs used. Put differently, the bindings do not enable a rider to substantially change his or her initial foot positions or posture while riding. Additionally, although the bottoms of a rider's feet are able to tilt away from being parallel to the top of the snowboard, springs resist this movement. Thus, the springs allow movement, but are biased toward restoring the bindings (and therefore a rider's feet) to the unloaded position, which is essentially parallel to the top planar surface of the snowboard. So, U.S. Pat. No. 6,296,258 B2 does not allow a significantly large sector of foot rotation while riding. Additionally, the embodiment(s) of U.S. Pat. No. 6,296,258 B2 does (do) not provide means to maintain the foot bottom essentially perpendicular to the axis formed by the respective central foot region and hip joint.

U.S. Pat. Nos. 6,382,658 B1 and 6,394,483 B2, both to D. P. Stubblefield disclose a snowboard or ski having a unique shape under the regions to which a rider's feet attach. Certain embodiment(s) disclosed have thicker cross sectional areas around the binding/foot regions. This is done to change the flexural behavior of the board or ski under load, particularly while turning. From the text of 6,382,658 B1 Col. 16, line 55:

"As in the first and second preferred embodiments, core 38 (not shown) of dual-cambered snowboard 10" is thinnest in the areas of nose 12 and tail 14, thinner in center section 30, and thickest under the rider's feed in front mounting zone 24 and rear mounting zone 28."

If, in some embodiments, the surfaces for mounting the bindings were to be tilted inward toward the rider, and if a binding system that was free to rotate were attached, certain ergonomic benefits would be obtained, albeit in part. What then might be obtained is the orienting of the feet such that each respective foot bottom is closer to being perpendicular to the axis formed by the companion central foot region and hip joint. However, if by chance (or even design) the angular tilt is coplanar (or parallel to) a desired foot position, and a binding system is used that allows free rotation, such a correct alignment would only be true for a single position and not the full sector of rotation. This is true due to the dynamics of a rider's skeletal system for free foot rotation while riding a sportboard. In particular, the twisting of the torso and hips creates a challenge in maintaining the bottoms of the rider's feet essentially perpendicular to the respective central foot region-hip axes. The technology introduce by U.S. Pat. No. 6,382,658 B1 and U.S. Pat. No. 6,394,483 B2 is directed to a different problem and does not provide means to maintain the foot bottom essentially perpendicular to the axis formed by the respective central foot region and hip joint U.S. Pat. No. 6,491,310 B1 to A. Work discloses a swiveling binding system that allows both feet of a rider to rotate freely about essentially vertical, respective axes. The design has the advantage of being simple, since the binding mounts operate independently of each other. Thus, the rider is required to maintain alignment of his or her feet while operating. Arguably, compared to U.S. Pat. No. 6,257,614 B1/Duggan, control is more difficult for riders that are less expert or while riding at higher speeds and/or over rougher terrain. However, this depends upon other factors, such as, how freely the binding mounts of U.S. Pat. No. 6,491,310 B1/Work rotate, etc. Thus, it may become a matter of preference for more skilled riders. However, the embodiment(s) of U.S. Pat. No. 6,491,310 B1 can still be improved since it (they) also does (do) not maintain the bottoms of a rider's feet essentially perpendicular to the respective central foot region-hip axes.

U.S. Pat. No. 6,499,758 B1 to L. Fournier discloses a sportsboard having an ergonomic upper surface. According to the text of U.S. Pat. No. 6,499,758 (Abstract) the surface includes:

"at least one upwardly angled portion with respect to a center of the sportsboard adapted to contact the extremities of a rider, e.g., the feet boots and/or bindings."

Such geometric surfaces are likely an improvement to the interface of a rider with the sportsboard, albeit designed for non-rotating binding systems. As mentioned with regard to U.S. Pat. Nos. 6,382,658 B1 and 6,394,483 B2 to Stubblefield, if 6,499,758 B1 to L. Fournier is used with a binding system that allows free rotation, such an ergonomically correct alignment of extremities occurs for essentially a single position and not the full sector of rotation. Thus, the technology of U.S. Pat. No. 6,499,758 B1/Fournier is an ergonomic improvement that is for essentially static foot, boot, or binding contact and is not designed to work for freely rotating bindings.

U.S. Pat. No. 6,505,841 B1 to H. Kessler et al discloses a spacer for snowboards that has ergonomic and functional advantages. The functional advantages relate essentially to improving the force transmission between a rider's heels and toes and the snowboard. Additionally, by elevating the rider's heels and toes, the ends of the boot do not drag in the snow while turning. This advantage is identified in other US patents, such as U.S. Pat. No. 6,296,258 B2/Higgins & Caputo, listed earlier. The ergonomic advantage of U.S. Pat. No. 6,505,841 B1/Kessler (et al) is obtained via an angular tilt of the spacer: Such an angular tilt orients the bottom planar surface of the rider's foot more normal to the axis passing through the respective central foot region and hip joint. However, this is designed for a non-rotating binding system, with static boot or binding contact with the topmost outer portions of the spacer. Yet, if embodiment(s) of the spacer that have the tilt feature, were able to be used with bindings that freely rotate, the ergonomic advantage would occur only at essentially one point on the sector of rotation. Thus, the embodiment(s) of U.S. Pat. No. 6,505,841 B1 does (do) not maintain the bottoms of a rider's feet essentially perpendicular to the respective central foot region-hip axes.

U.S. Pat. No. 6,663,118 B1 to T. Otsuji et al introduces a "Snowboard Interface With An Upper Portion That Translates And Rotates Relative To A Lower Portion". The snowboard interface item introduced is essentially a boot with structural elements and pivoting means. The pivoting means is located in a region relatively close to the portion of the boot enclosing the rider's ankle. The pivoting/guiding action is essentially about a horizontal axis oriented in a direction substantially parallel to the main heel to toe axis of the foot. Thus, pivoting/guidance for the lower leg occurs in a vertical plane essentially normal to that horizontal axis. This allows a rider's lower legs to move inward, towards and away from each other. The embodiment(s) of U.S. Pat. No. 6,663,118 B1/Otsuji (et al) operate in a manner not identical to, but similar to, U.S. Pat. No. 6,209,229/Bourdeau. The embodiments of both technologies utilize a mechanism that pivots about an axis located near the rider's ankle joint. Both the Bordeau and Otsuji (et al) technologies also essentially maintain the foot bottoms parallel to the surface of the snowboard or sportboard. Thus, the technology of U.S. Pat. No. 6,663,118 B1/Otsuji also:

Does not provide continuously variable foot rotation about a vertical axis, and, Does not maintain the bottom of the foot essentially perpendicular to the axis formed by the respective central foot region and hip joint.

U.S. Pat. No. 7,059,614 B2 to C. Cole, III et al introduces a binding base that freely rotates about a vertical axis shown perpendicular to a sportboard (identified as "Y" in FIG. 3 of that document).

In a first embodiment(s) disclosed, U.S. Pat. No. 7,059,614 B2/Cole, III (et al) functions much like that of U.S. Pat. No. 6,491,310 B1/Work. However, in a second embodiment of U.S. Pat. No. 7,059,614 B2 also provided is a different freedom of movement by introducing the use of "hinged assemblies", shown in FIGS. 4 and 5 of that document. A "Z" axis is identified in U.S. Pat. No. 7,059,614 B2 as being essentially collinear with the longitudinal axis of the sportboard, and an "X" axis is shown normal to the Y and Z axes (FIG. 3). The hinged assemblies are illustrated in FIGS. 4 & 5 with pin axes aligned with the X axes of the system (one of each per foot, respectively). Thus, as can be seen in FIG. 4 of U.S. Pat. No. 7,059,614 B2, a rider can tilt either leg toward or away from the sportboard ends. However, since the pin axis of the hinged assembly (ref. "AXIS X" in FIG. 3 of U.S. Pat. No. 7,059,614 B2) is oriented perpendicular to the Z axis, the control means that is necessary to tilt the sportboard about the Z axis is maintained.

In still further embodiment(s) of U.S. Pat. No. 7,059,614 B2, the base that freely rotates about the Y axis is combined with the hinged assembly. Yet to maintain control of the sportboard, a particular orientation of the hinged assembly and binding base must be maintained. The language of U.S. Pat. No. 7,059,614 B2 (column 4, line 56) includes:

"X-axis and Y-axis rotation can be combined by mounting the Y-axis binding shown in FIGS. 1 and 2 to the top (but preferably not beneath in order to maintain edge or Z-axis control of hinge assembly 42 and board. Alternatively, one binding can be of this Y-axis above X-axis arrangement for edge control, and the other binding in the opposite configuration (X-axis above Y-axis) to provide the effect of a universal ball joint"

Thus, at least one of the hinged assemblies must be essentially fixed to the sportboard, i.e., not rotate about the Y-axis. Additionally, the hinge pin of the fixed (non-rotating about Y-axis) hinge assembly must be perpendicular to the Z-axis of the sportboard. This is required to enable a rider to tilt the sportboard, and thereby control it for turning and also to maintain balance. Yet, in this configuration the burden of applying the tilting force for balance and turning, is then placed upon only one leg. Still another variation applicable to all of the aforementioned embodiments described in U.S. Pat. No. 7,059,614 B2 includes the freedom to translate roughly along the Z-axis for one of the foot/boot mounting positions.

Notwithstanding, though greater degrees of freedom are provided by the various embodiments of U.S. Pat. No. 7,059,614 B2, it does not secure preferred ergonomic results. Several configurations do enable foot rotation about a vertical axis—identified as Y-axis in the document. Further freedom is allowed by the hinged assemblies. However, the hinged assemblies provide an imposition upon the rider to either provide the necessary ankle support or to use means to do so, e.g., hard shell boots, or similar. Nevertheless, none of the embodiments of U.S. Pat. No. 7,059,614 B2 maintains the bottoms of a rider's feet essentially perpendicular to the axes formed by the respective central foot regions and hip joints.

U.S. Pat. No. 7,097,195 B2 to K. Orr et al introduces a binding system that includes a "base plate", to which a rider's foot is mounted. The pivoting action allows a more natural alignment of the foot with the leg during riding. The embodiment(s) disclosed suggest that the design of U.S. Pat. No. 7,097,195 B2/Orr allows the bottom of a rider's foot to become essentially perpendicular to the axis formed by the respective central foot region and hip joint. However, also utilized are "compression members" that resist pivoting movement and dampen vibration. When the compression members are engaged, the more natural alignment of the rider's foot (essentially perpendicular to the respective central foot region & hip joint axis) occurs by way of operator induced forces and/or torques. Thus, a restoring force is present when a rider's foot is aligned correctly that will resist the operator's efforts. This has the potential for operator discomfort and/or fatigue.

Additionally, the language of U.S. Pat. No. 7,097,195 B2 (column 4, line 50) includes the following regarding rotation about an essentially vertical axis:

"The base plate 12 is further adapted to mate to a snowboard 11 in a manner in which the base plate 12 is preferably non-rotatable, yet is pivotably movable about a central axis A."

Thus, the motion of U.S. Pat. No. 7,097,195 B2 essentially does not include allowing a rider to freely rotate his or her feet while operating the sportboard. So, the embodiment(s) of U.S. Pat. No. 7,097,195 B2 basically does (do) not allow the desired foot rotation or properly maintain the desired foot-leg alignment while in use.

US Patent Application Publication No. US 2003/0146588 A1 and US 2005/0029757 A1 by Fiebing illustrate embodiments of an independently rotating binding base that is angled or canted relative to the top planar surface of a snowboard. The angular orientation attempts to address rider ergonomics while providing the advantages of free foot rotation while riding. The embodiments shown in US 2005/0029757 A1 have relatively few components, which is generally advantageous. US 2005/0029757 A1 also allows a rider to freely rotate her or his feet while riding, which enables some of the new types of riding maneuvers mentioned earlier. However, the embodiments revealed only partially address the ergonomic needs of a rider. The angular tilt of the "cant disk" shown in FIGS. 9 & 10 of US 2005/0029757 A1 technically provides an ergonomically correct alignment at a single point on the full arc sector of operation. Put differently, the bottoms of a rider's feet are essentially perpendicular to the axes formed by the respective central foot regions and hip joints— only at one position of the entire sector of rotation. For practical purposes, this amounts to a small sector of use. As a rider rotates his or her foot & leg beyond either side of that ergonomically correct position, the bottom of the rider's foot will become further away from being perpendicular to the axis formed by a respective central foot region and hip joint. Thus the embodiments put forth in US 2003/0146588 A1 and US 2005/0029757 A1 by Fiebing do not address sufficiently the ergonomic requirements identified in this present patent application.

US Patent Application Publication No. US 2007/0013165 A1 by Panzeri shows a boot binding system having a foot or boot mount that rotates about a vertical axis. The embodiments shown have relatively few components, which is generally advantageous. The embodiments shown have mating components that make contact via spherical shaped contact surfaces. These features are arranged to allow pivoting in addition to swiveling or shifting axial positions. Thus, embodiments of US 2007/0013165 A1/Panzeri enable a rider's foot to rotate about other axes, angularly adjacent to the vertical axis. This pattern of axial positions forms a zone that is of a conic shape, above (& below) the sportboard. This arrangement is described in paragraph of US 2007/0013165 A1 as "a simple sliding joint". In paragraph [0022] of the same document the text reads: "This allows the rider's foot to roll relative to the board, which allows greater freedom of movement and may help prevent injuries." Thus, the mechanism utilized by US 2007/0013165 A1 allows an axis (of rotation) to shift throughout a conic pattern via shifting or sliding from position to position. This motion might be described as traversing arcuately across or about a small zone of a spherical constraining surface with freedom of axial rotation.

The embodiments of US 2007/0013165 A1 also include a "braking means" used as a control feature. The braking means is engaged when the "button" (rotating-sliding part) moves away from the neutral position. The neutral position is one wherein the axis of the button is essentially vertical, i.e., essentially perpendicular to the snowboard. The braking means is essentially engaged at the outer limits of the spherical zone of travel of the button. Paragraph [0023] of US 2007/0013165 A1 discusses the need for, and operation of, a braking means to control the sportboard when performing maneuvers and turning.

That the embodiments of US 2007/0013165 A1 are allowed to rotate is good. Also, the bottom of the rider's foot is allowed to assume a position perpendicular to the axis formed by the respective central foot region and hip joint. That is very desirable. However, with the freedom of sliding about such a spherical surface, a difficulty is incurred. A rider is required to maintain both respective foot-leg orientations throughout the rotational movement. There is some natural tendency of the body structure to follow such an ergonomic orientation. Yet an effort to maintain this alignment is a burden with soft type boots and more so for direct foot-to-binding arrangements. The embodiments disclosed arguably might work better with hard shell (or stiffer) boots; however, that introduces a restriction to the more common types of sportboarding.

There is also a shortcoming with regard to the kinematics of the device and use of the braking means to control the sportboard. To turn the sportboard, a tilting force (moment) must be imparted about the longitudinal axis; this is a well established fact found throughout this art's literature. To do so with the embodiments of US 2007/0013165 A1, a rider's feet must shift or slide from the position they are in to the position where they engage the braking element. That is essentially a mechanical play (a.k.a. tolerance, slop, backlash, etc.) in the system that delays response to the desired movement. Thus, while turning, the embodiments of US 2007/0013165 A1 intrinsically have a delayed turning response.

To conclude regarding US 2007/0013165 A1/Panzeri—if configured correctly, an embodiment may allow a rider's legs to align the bottoms of a rider's feet essentially perpendicular to the axes formed by that rider's respective central foot regions and hip joints. However, at best it will allow such a correct orientation to become assumed. The embodiments of US 2007/0013165 A1/Panzeri will not establish or maintain a correct foot to leg posture intrinsically; the turning response is also compromised.

European Patent No. DE 202 20 683 U1 by Jolanta, Mekal & Krzysztof, Mekal shows a binding mounting system that allows individual foot rotation about two axes. From the abstract of DE20220683U1 (as published via European Patent Office):

"A fixture plate (11) is positioned on the surface of the snowboard and has a shoe-attachment linked to it. The attachment swivels on a first pivot axle in relation to the fixture plate, parallel with the snowboard's surface and at right angles to the snowboard's lengthwise axis. A pivot link enables the attachment to swivel on another rotary axle (3) at right angles to a surface holding the shoe-sole. A rotary disc (4) holds the shoe to which it is detachably joined by a pin (5) protruding upwards from the disc and gripped round by sprung rollers (8) with traction-cable (9)."

In FIG. 1 of DE20220683U1 a longitudinal axis of a sportboard is identified as "X". Respective axes identified as "Y1" & "Y2" (1/ea. foot position) are shown perpendicular and coplanar to X. The Y axes identify the rotational capability of fixture plate 11. FIG. 2 of DE20220683U1 shows the lower portion of fixture plate 11 attached to the top surface of snowboard 6. The upper portion of fixture plate 11 is attached to a rotary disc 4. Thus, rotary disc 4 is thus free to rotate about a respective Y axis. Additionally, rotary disc 4 is itself free to rotate about an infinite series of axes identified as "Z1, Z1', Z2, Z2'" in FIG. 1, which remain perpendicular to Y. Thus, as the upper portion of fixture plate 11 rotates, the Z axis for rotary disc 4 sweeps through an arc sector. This arc of Z axes series, free to rotate about respective Y axes, establishes a plane that is essentially coplanar with the X axis, or is at least essentially parallel to the X axis (long. axis of sportboard).

Thus, a rider using an embodiment of DE20220683U1 is able to rotate his or her feet about an axis (Z_) that is essentially perpendicular to the bottom of the foot. Additionally, the rider is able to simultaneously rotate her/his feet about a fixed, horizontal axis (Y) toward or away from the ends of the snowboard. A rider is therefore able to rotate his or her feet from regular to goofy positions and all intermediate positions via the Z axis, which is good. The additional freedom of rotation about the Y axis provides some ergonomic advantages. It allows the foot-leg position to obtain some relief. However, this alignment does not maintain the bottom of a rider's foot essentially perpendicular to the axis formed by/passing through the respective central foot region and hip joint. This is intrinsic to the action of the mechanism employed with DE20220683U1. This becomes apparent when it is considered that (a foot's) Z axis positions are maintained perpendicular to a Y axis and that the Y (horizontal) axis is also fixed. The natural ergonomic orientation of the foot bottom when moving from a goofy to a regular position traces planar regions that only share the Y axis of DE20220683U1 at technically one single position (point) on the arc sector of travel. This restriction is most apparent at the extreme ends of the foot's rotational sector, i.e., at or beyond the typical regular and goofy foot positions. So, the dynamics of DE20220683U1 do not provide the proper ergonomic positioning of a rider's foot-leg though it affords greater flexibility.

Additionally, for preferred stability, the embodiments of DE20220683U1 arguably require more rigid type boots for ankle support given freedom of rotation about the Y axis. Of course this limits the movement between the lower leg and respective foot and therefore restricts the types of riding capable with the embodiments of DE20220683U1. Thus, the embodiments of DE20220683U1 do not satisfy the need to maintain the bottoms of a rider's feet essentially perpendicular to the axes formed by the respective central foot regions and hip joints. Additionally, the freedom of movement afforded via the Y axis requires more support for a rider's ankles, either to be maintained by efforts of the rider or by utilizing more rigid boots.

Prior Art—Summary

A review of the prior art in sportboarding shows that greater freedom of movement is desired & advantageous. Recently, more attempts have been made to improve riding by allowing foot rotation and/or pivoting. Additionally, though arguably not well understood, the need for an improved ergonomic connection to sportboards has been recognized. To that end, numerous efforts have been made to satisfy the ergonomic requirements of eliminating fatigue while providing comfort and securing rider, control. As is evident, the variety of embodiments in the prior art show the difficulty in pursuing these objectives. Thus far, it may be argued that the need to maintain the bottoms of a rider's feet essentially perpendicular to the axes formed by the respective central foot regions and hip joints has not yet been understood. However, if this need has been identified, a viable means to accomplish that requirement has not been shown in the prior art. There is therefore a need for a foot/boot binding system that provides rotational freedom in a more ergonomically correct manner.

SUMMARY

In accordance with one embodiment a foot binding or boot binding or binding mounting system for a sportboard that may be described as having:
 A foot binding plate or boot binding plate or mounting plate for bindings that is essentially free to rotate about an axis,
 A tilt or inclination applied to the axis of rotation by a predetermined angular amount,
 A support surface on the binding plate or mounting plate supporting the bottom of a rider's foot that is free to rotate about the tilted axis,
 A tilt or inclination of the support surface relative to the axis of rotation by a predetermined angular amount such that the medial portion of a rider's foot is tilted upward and the lateral portion of the foot is tilted downward with respect to a plane perpendicular to the axis of rotation.

DRAWINGS

Figures

Figure 5:
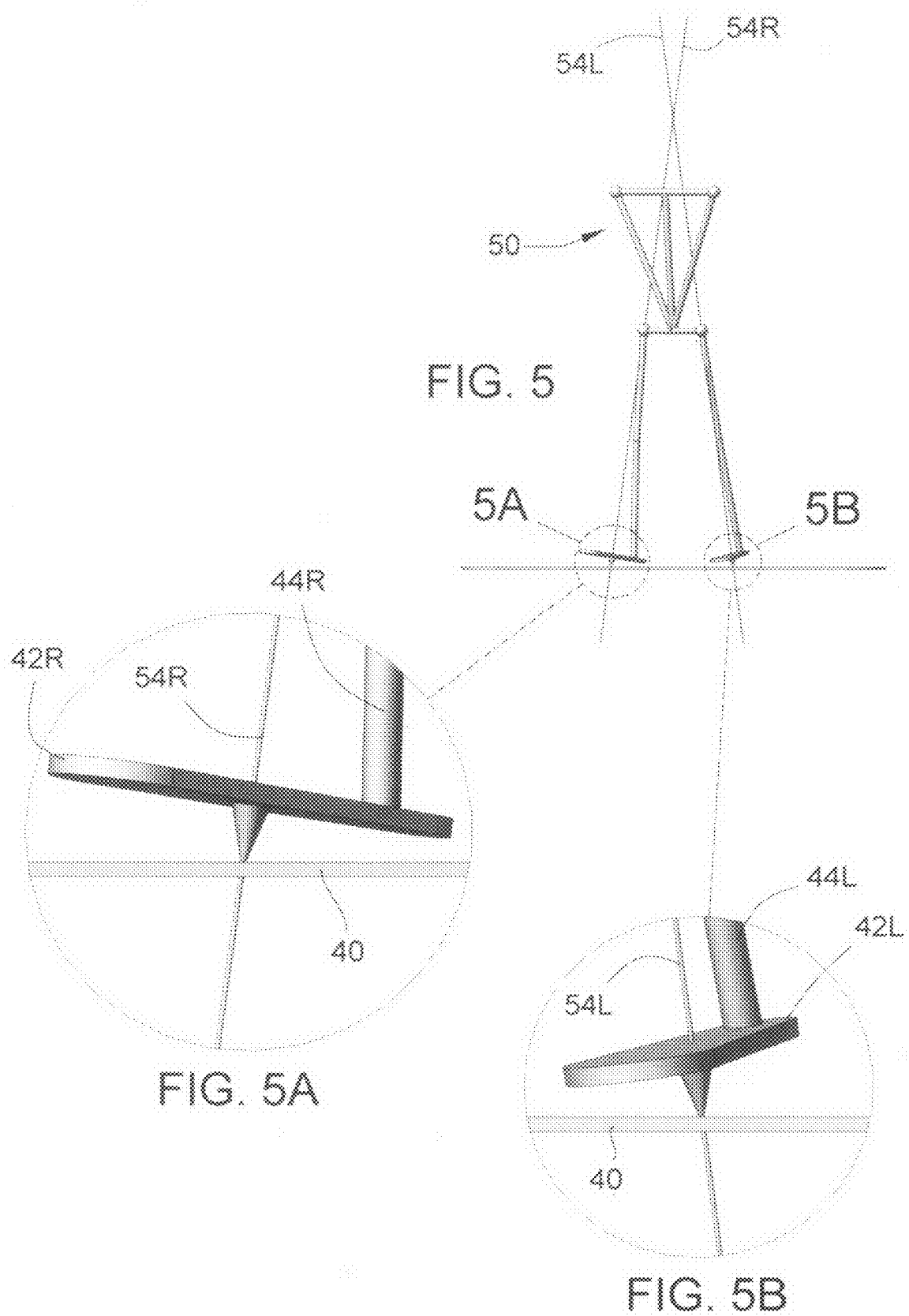

FIGS. 5, 5A, & 5B are front views of a schematic sportboard & rider; positioned 'goofy'.

Figure 6:
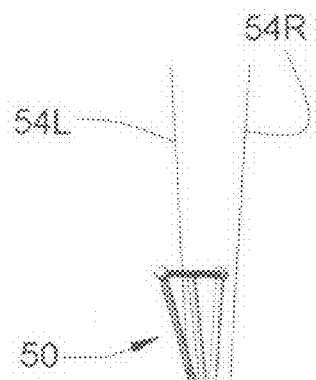
Figure 6A:
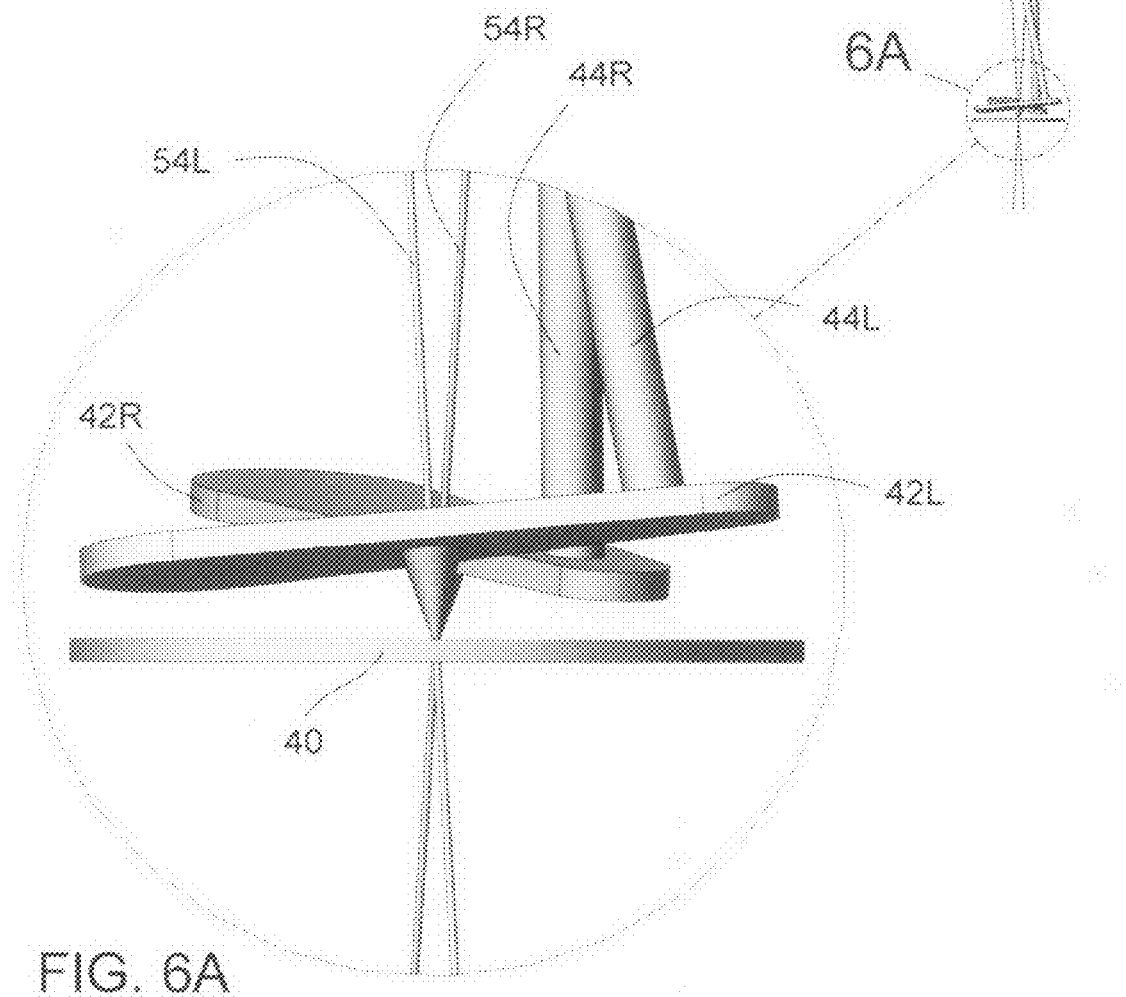

FIGS. 6 & 6A are side views of a schematic sportboard & rider; positioned 'goofy'.

Figure 7:
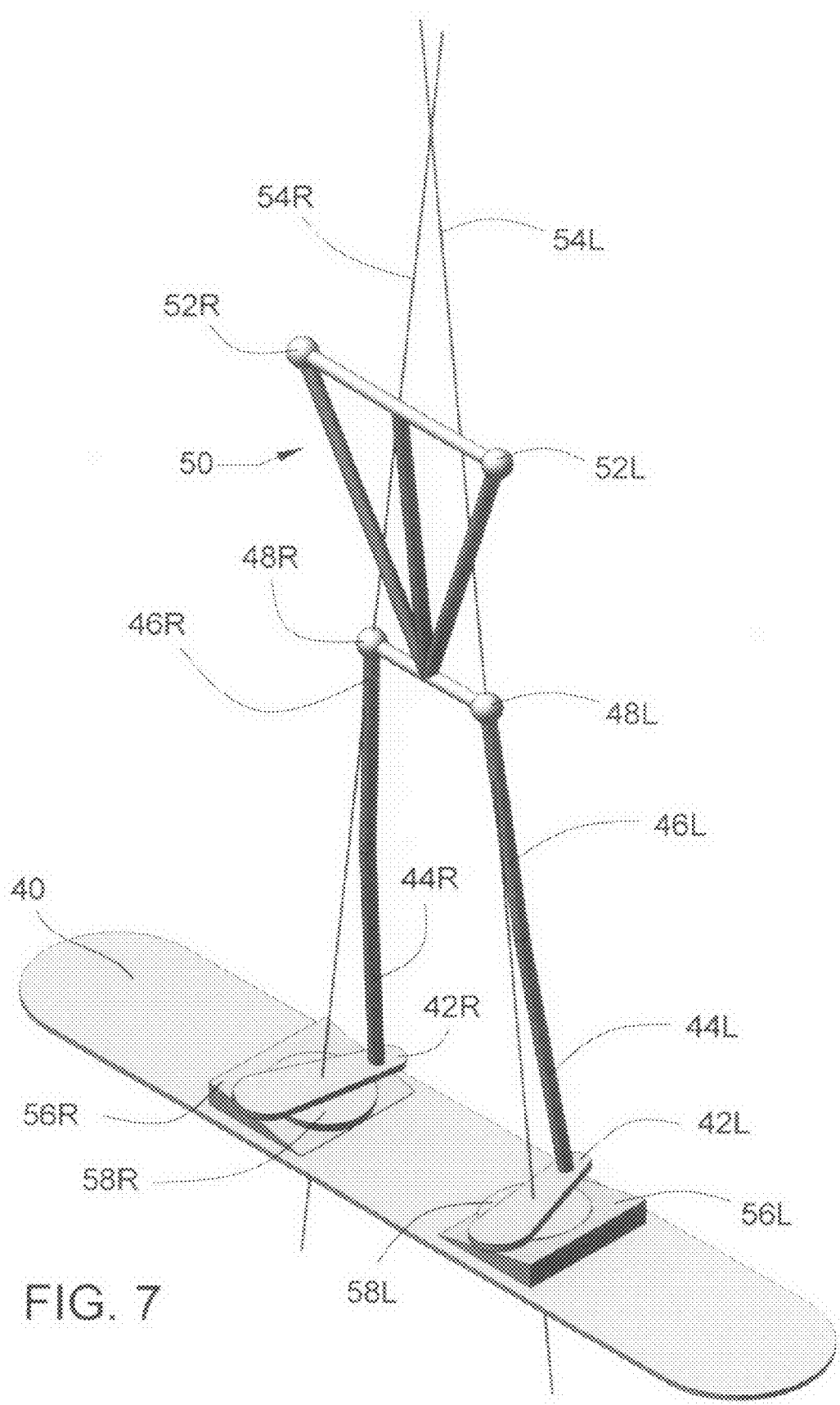

FIG. 7 is an isometric view of a schematic sportboard, rider, & tilt bases; facing neutral.

Figure 8:
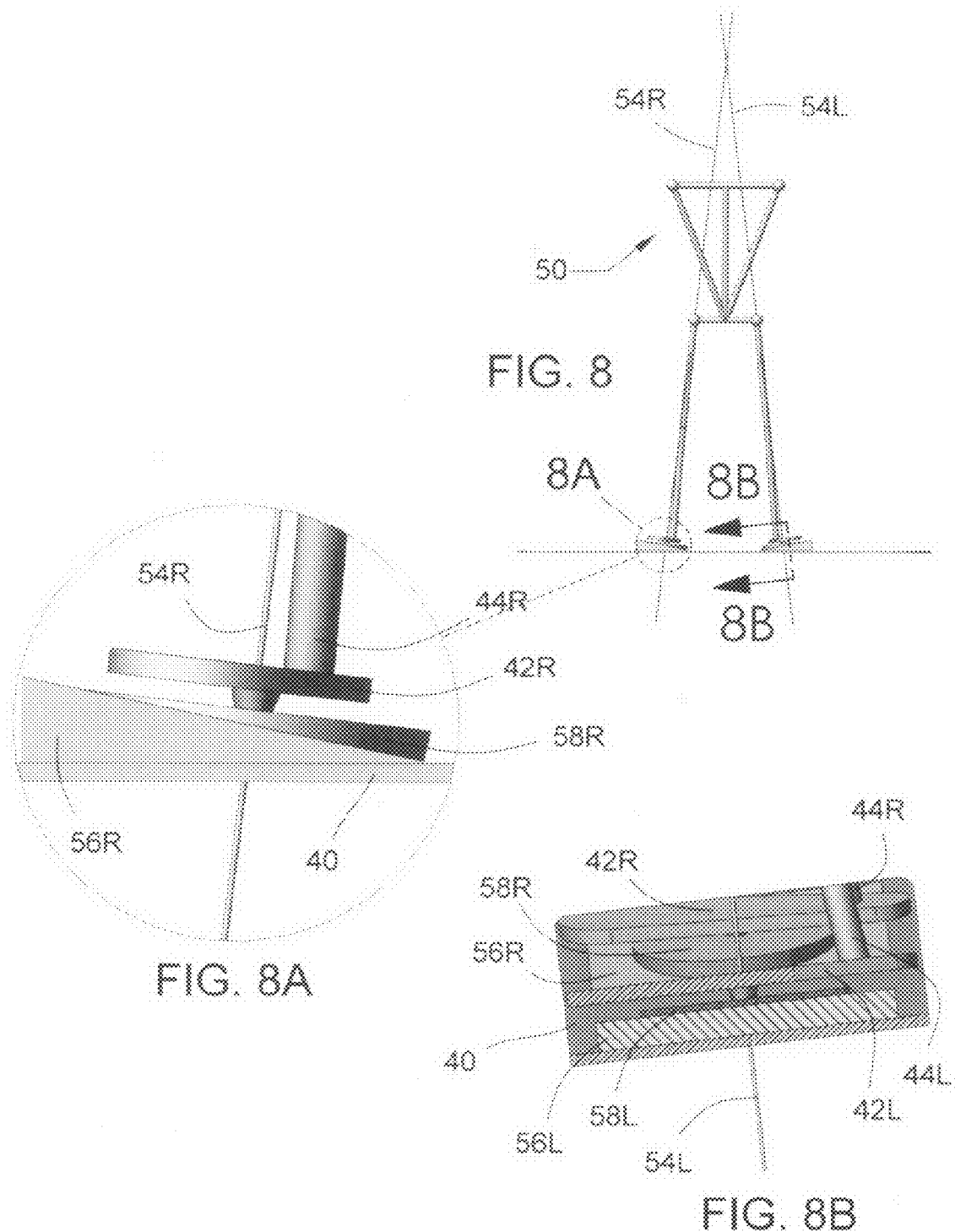

FIGS. 8, 8A, & 8B are front views of a schematic sportboard, rider, & tilt bases; facing neutral.

Figure 9:
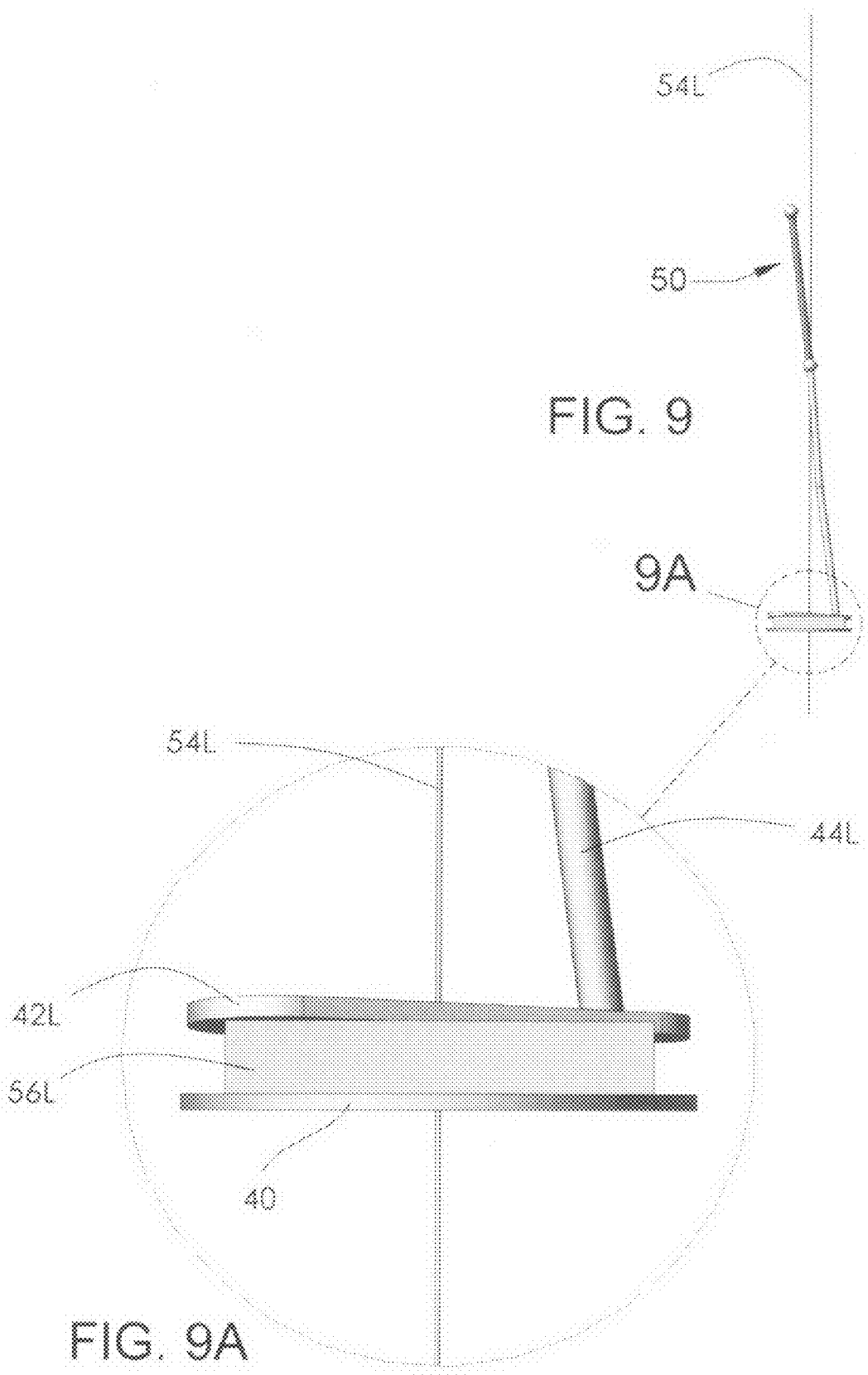

FIGS. 9 & 9A are both side views of a schematic sportboard, rider, & tilt bases; facing neutral.

Figure 10:
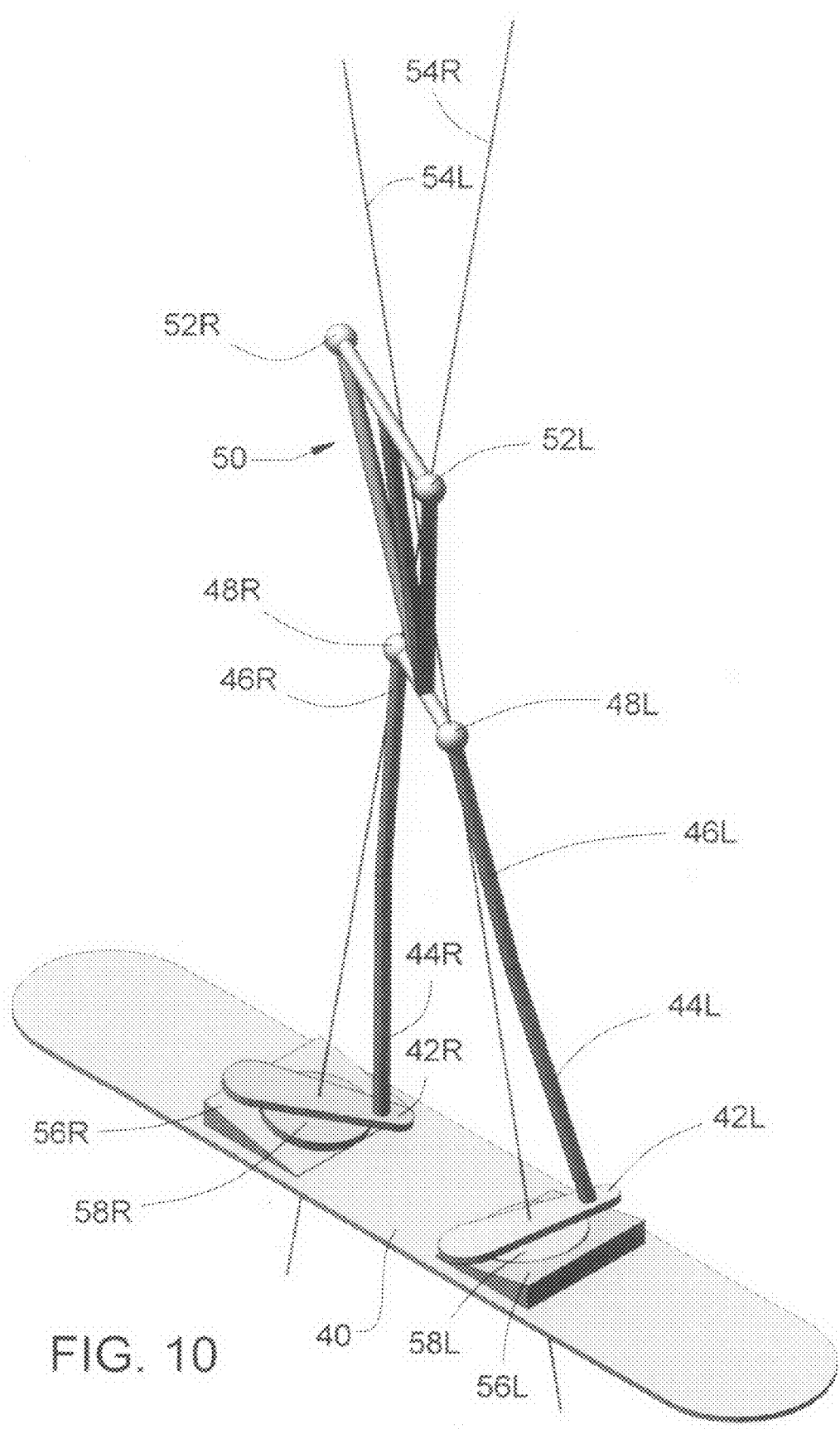

FIG. 10 is an isometric view of a schematic sportboard, rider, & tilt bases; positioned goofy.

Figure 11:

FIGS. 11, 11A, & 11B are front views of a schematic sportboard, rider, & tilt bases; positioned goofy.

Figure 12:
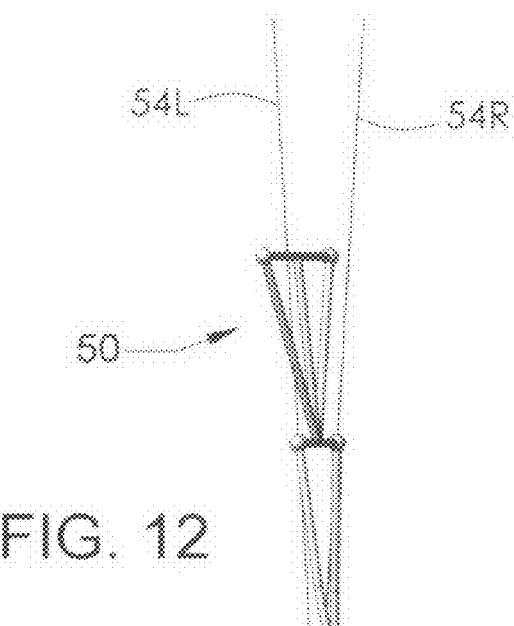
Figure 12A:
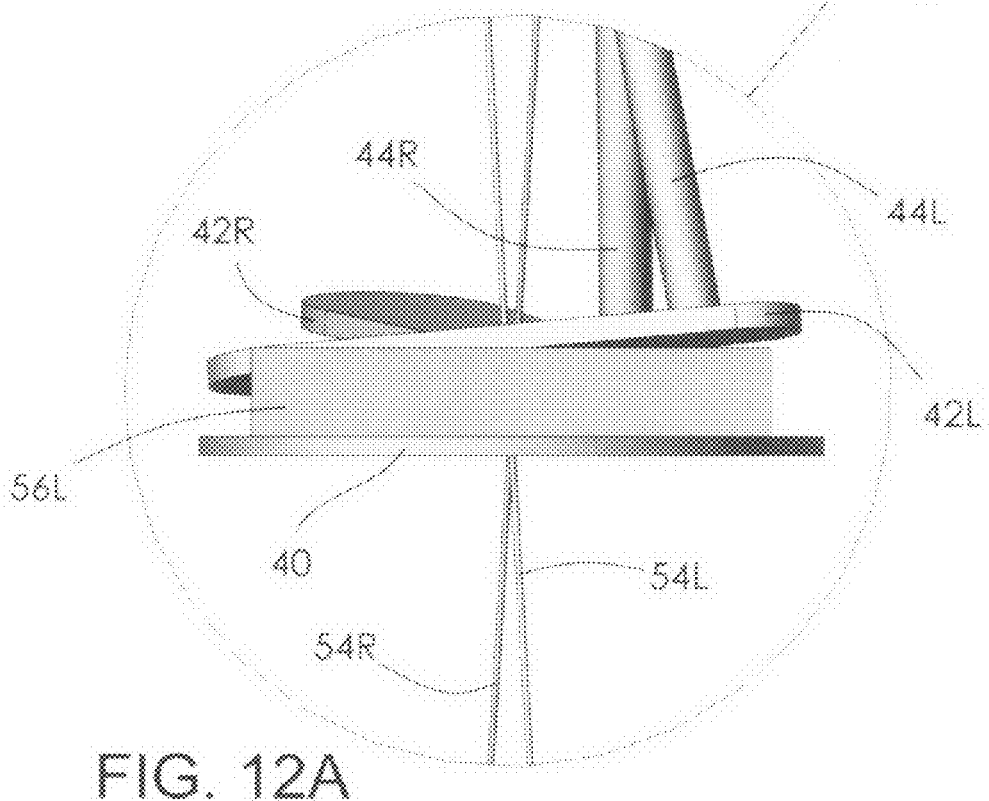

FIGS. 12 & 12A are side views of a schematic sportboard, rider, & tilt bases; positioned goofy.

Figure 13:
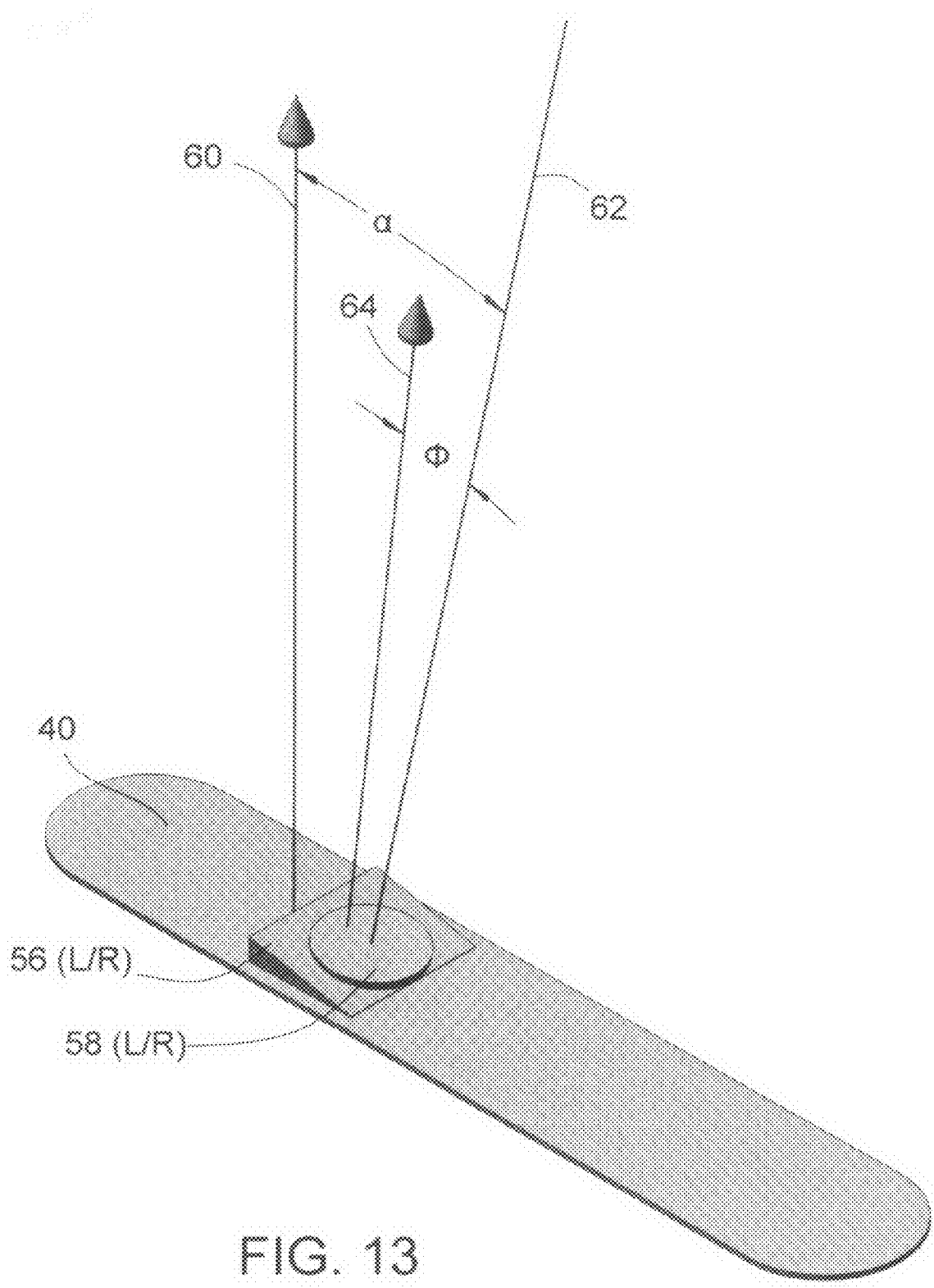

FIG. 13 is an isometric view of a schematic sportboard & tilt bases with reference geometry displayed.

Figure 14A:
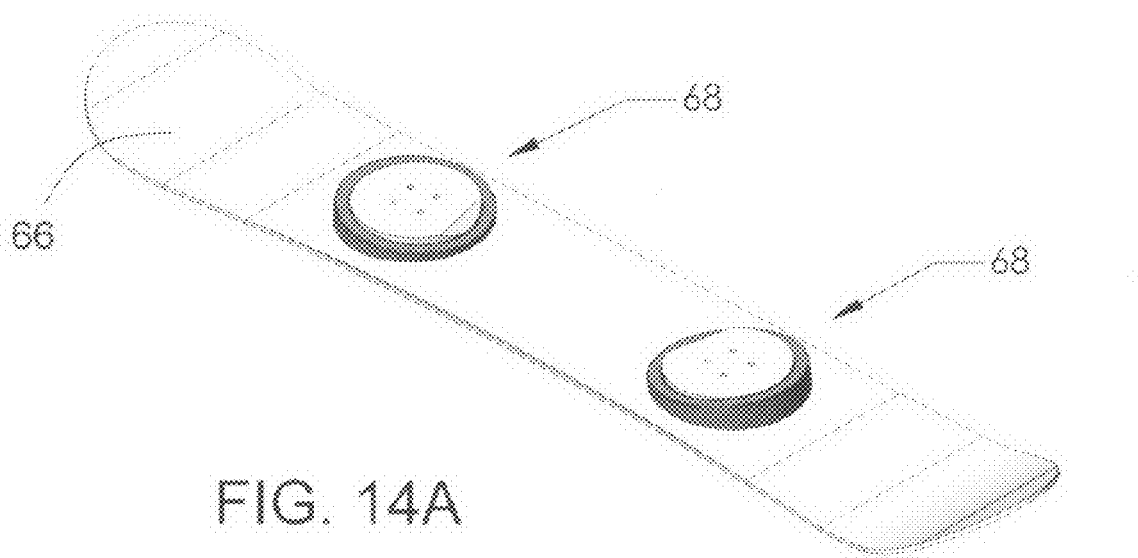
Figure 14B:
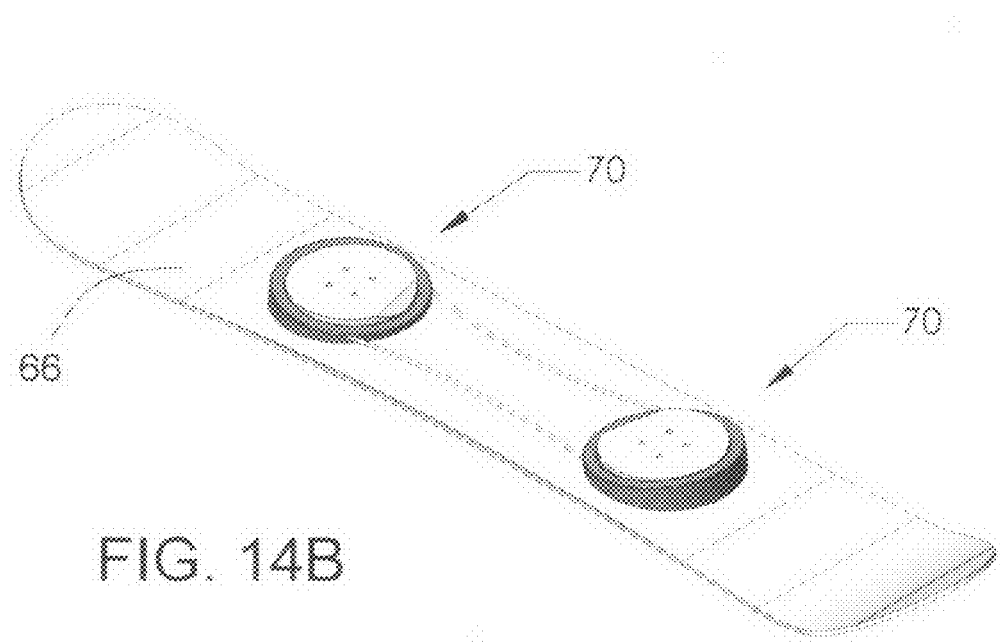

FIGS. 14A & 14B are isometric views of sportboard embodiments of this present application.

FIG. 15 is an isometric view with portions exploded, having detail view 16 identified, of a sportboard embodiment of this present application.

Figure 16:
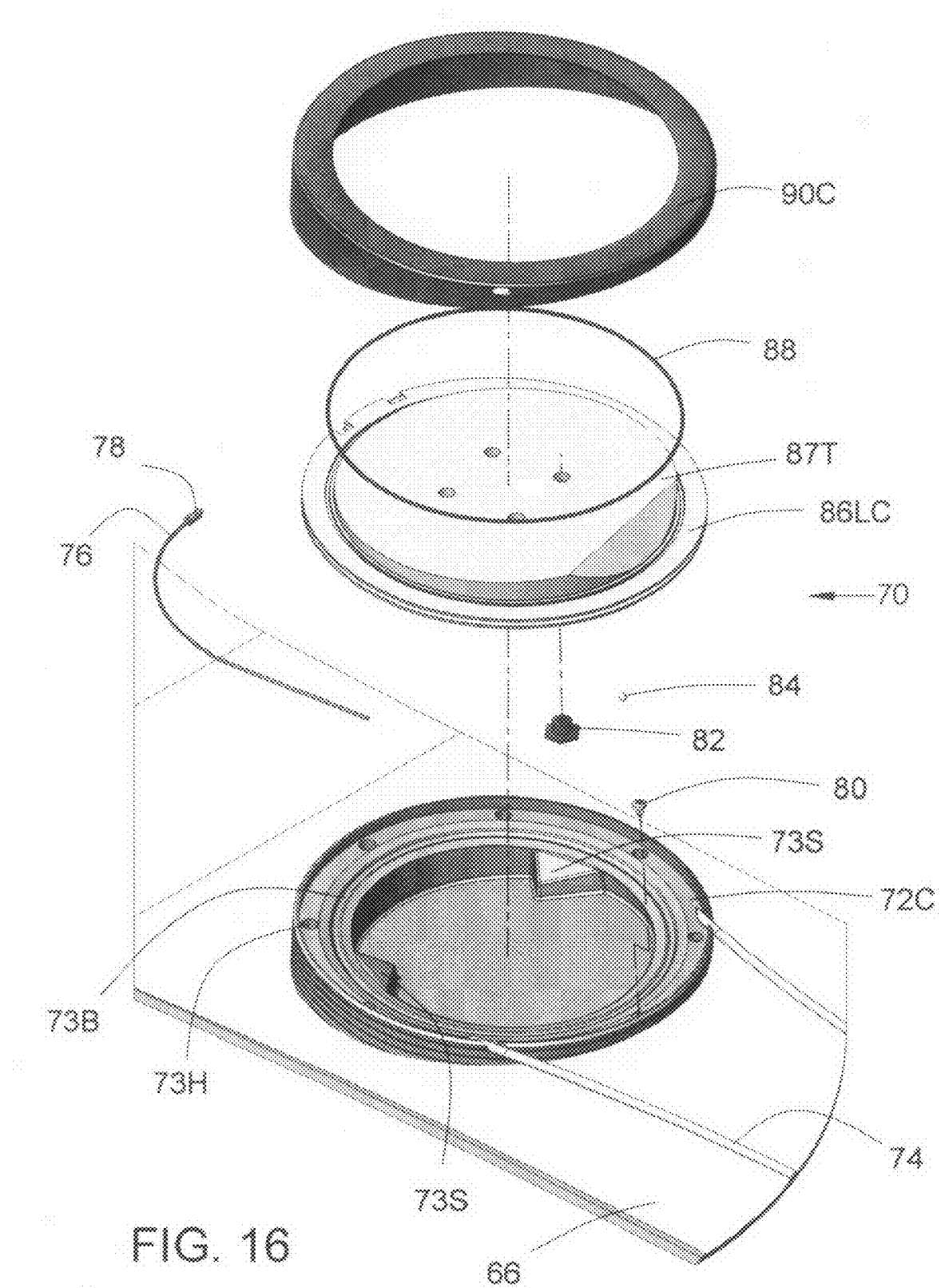

FIG. 16 is an isometric, exploded, detail view as generally identified in FIG. 15.

Figure 17:
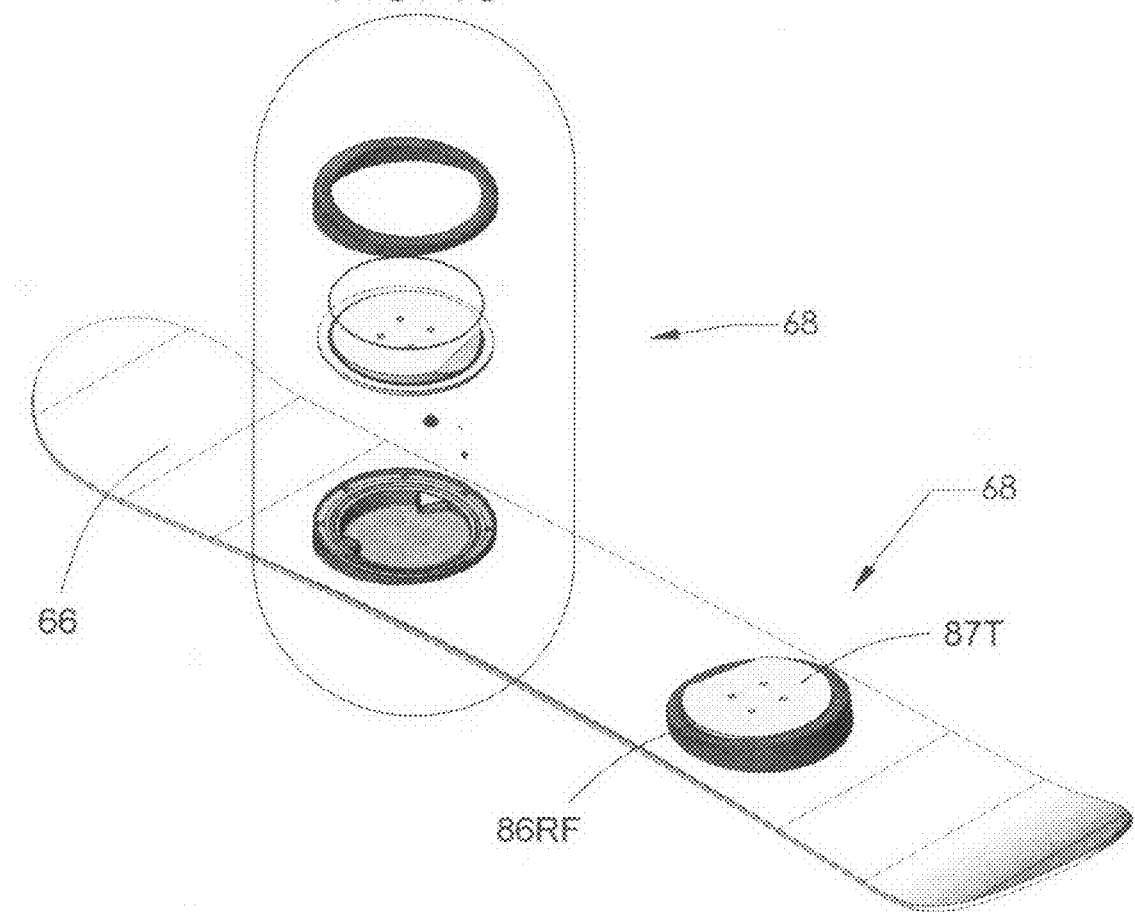

FIG. 17 is an isometric view with portions exploded, having detail view 18 identified, of a sportboard embodiment of this present application.

Figure 18:
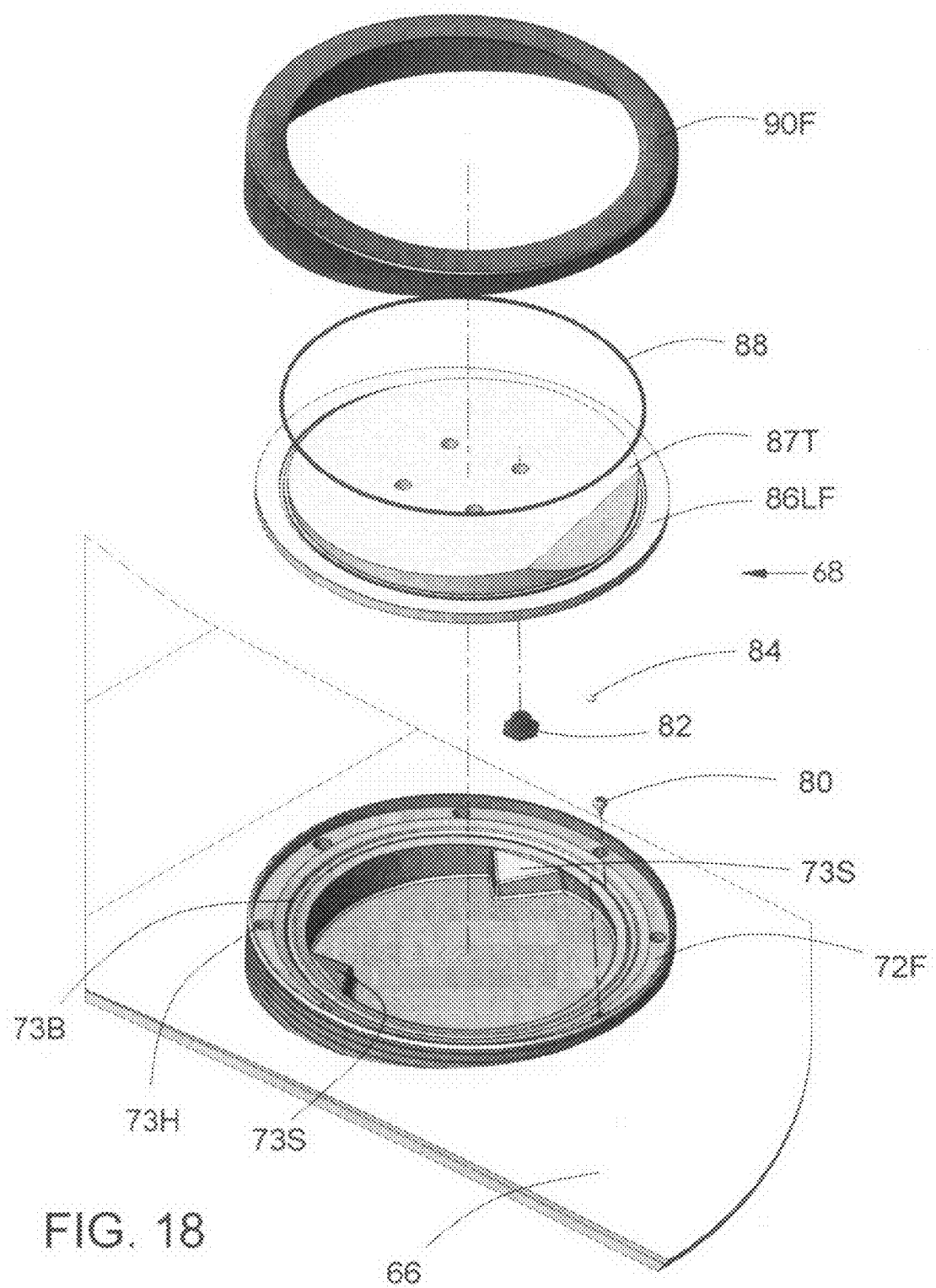

FIG. 18 is an isometric, exploded, detail view as generally identified in FIG. 17.

Figure 19:
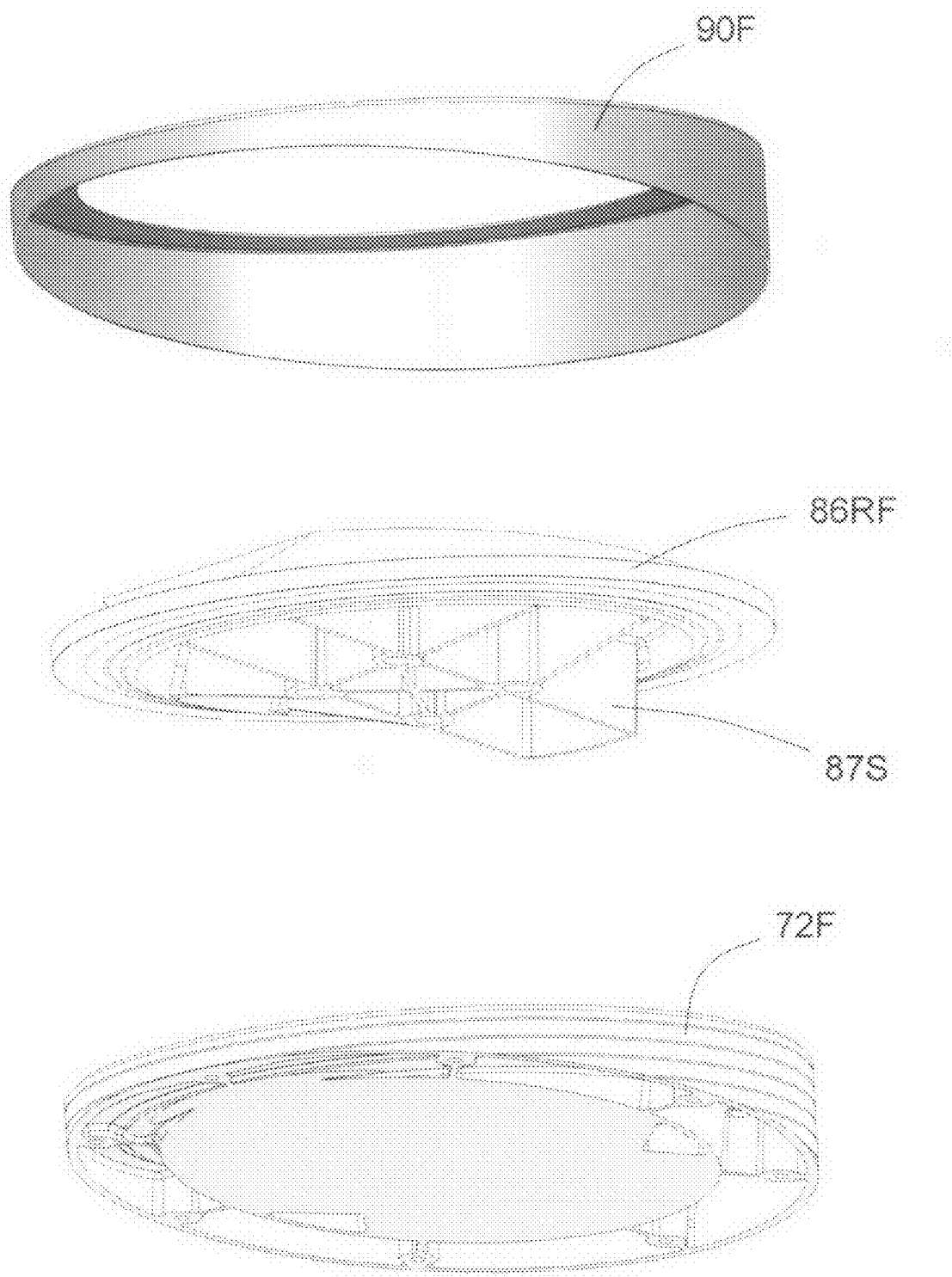

FIG. 19 is a modified isometric view of three main components of a sportboard embodiment of this present application.

Figure 20B:
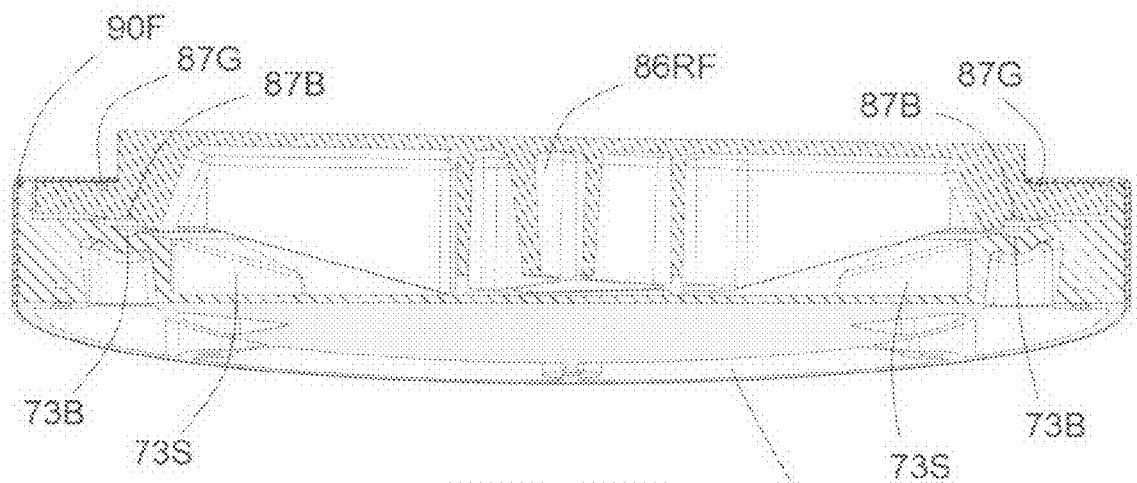
Figure 20A:
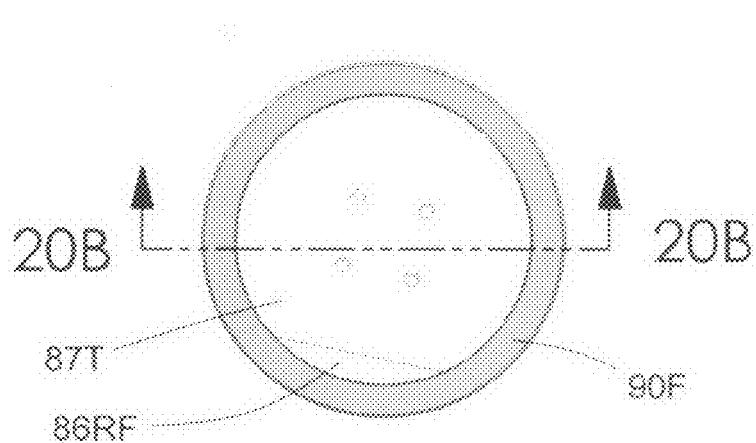

FIG. 20A is a top view and FIG. 20B is a section view of three main components of a sportboard embodiment of this present application.

FIG. 21A is a top view and FIG. 21B is a section view of three main components of a sportboard embodiment of this present application.

DRAWINGS
Reference Numerals/Indicia 40 schematic sportboard
42L schematic left foot
42R schematic right foot
44L schematic left lower leg
44R schematic right lower leg
46L schematic left upper leg
46R schematic right upper leg
48L schematic left hip joint
48R schematic right hip joint
50 schematic "T" & "V" torso
52L schematic left shoulder joint
52R schematic right shoulder joint
54L schematic left foot-hip axis
54R schematic right foot-hip axis
56L schematic left support tilt base
56R schematic right support tilt base
58L schematic left rotational tilt base
58R schematic right rotational tilt base
60 schematic sportboard normal vector
62 schematic support tilt base perpendicular axis
64 schematic rotational tilt base normal vector
66 sportboard
68 tilt base assembly, free
70 tilt base assembly, connected
72C tilted base plate, connected
72F tilted base plate, free
73B tilted base plate, bearing raceway feature
73H tilted base plate, fastener hole feature
73S tilted base plate, stop feature
74 cable housing
76 cable
78 cable end
80 screw
82 nut
84 ball bearing
86RC tilted rotating plate, right hand, connected
86RF tilted rotating plate, right hand, free
86LC tilted rotating plate, left hand, connected
86LF tilted rotating plate, left hand, free
87B tilted rotating plate, bearing raceway feature
87G tilted rotating plate, O-ring groove feature
87S tilted rotating plate, stop feature
87T tilted rotating plate, top surface
88 o-ring
90C cover, connected
90F cover, free

DETAILED DESCRIPTION

Detailed Description—FIGS. 1 through
13—Schematic Model Illustrations

Shown in FIGS. 1-13 are various views of simplified, schematic, computer generated model (3D CAD assembly) of a sportboard and rider. Schematic sportboard 40, is a simplified flat, planar structure. The schematic rider is a simplified structural model of a human skeleton. The schematic rider is not otherwise identified or named collectively, but is comprised of the following parts:

schematic left foot 42L & schematic right foot 42R,
schematic left lower leg 44L & schematic right lower leg 44R,
schematic left upper leg 46L & schematic right upper leg 46R,
schematic left hip joint 48L & schematic right hip joint 48R,
schematic "T" & "V" torso,
schematic left shoulder joint 52L & schematic right shoulder joint 52R.

Also shown are axes for spatial reference and indication of the angular orientation of the structure of the schematic rider. The axes are: schematic left foot-hip axis 54L & schematic right foot-hip axis 54R.

The schematic model was created for spatial and kinematic analysis. The model also serves to provide graphics similar to free-body-diagrams in some of the drawing views. The schematic model provides essentially twofold insight: 1) an understanding of the natural, preferred orientation of the human body for certain riding postures, and, 2) an understanding of the advantages of embodiments revealed in this present application. The schematic rider was created from (modeled after) the body dimensions of a living human being rider approx. 180 cm in height. Arguably, an average rider having a sound body structure with ordinary proportions could be used to create the schematic structure. This follows since the centers measurement of foot stance is generally proportional to the body frame of the rider. The lengths of the major bones of the living rider of approx. 180 cm height were measured and duplicated in the schematic CAD model. No schematic representation was made for the rider's arms, head, or neck in the schematic CAD model. The rider's centers measurement for foot spacing was also duplicated to follow that of the living human rider on a real, physical sportboard.

Detailed Description—FIGS. **1, 2, 2A, 3, &
3A**—Schematic Model

FIGS. 1, 2, 2A, 3, & 3A, are all images of the same schematic rider & sportboard, shown in the same positional orientation. However, the figures show different drawing views (a.k.a. drawing view angles) of the same schematic model.

Figure 1:
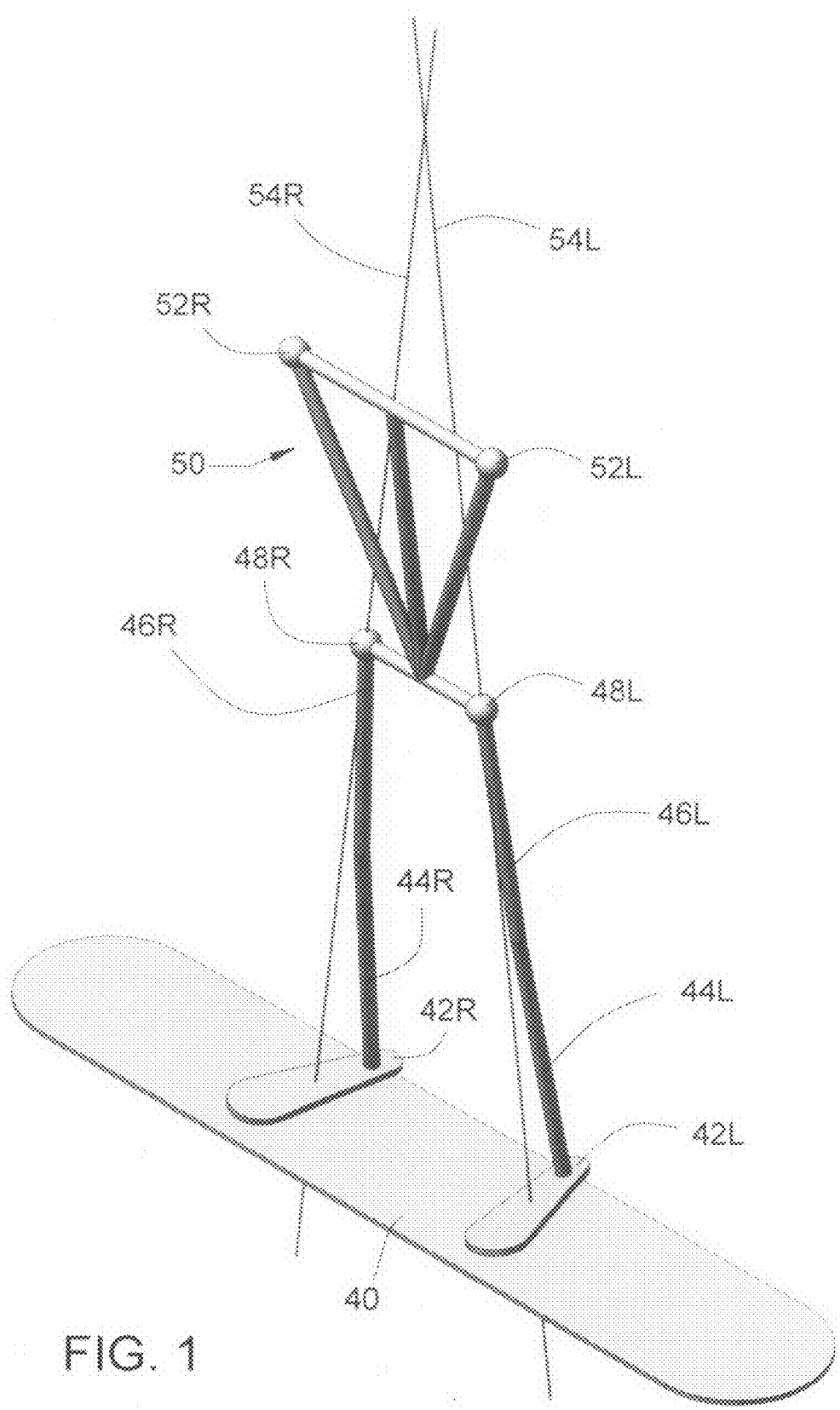
FIG. 1 is an isometric view of a schematic sportboard & rider; facing neutral.

Shown in FIG. 1 in an isometric view is a schematic sportboard 40, with a schematic rider simulating a foot centers stance of approx. 48 cm apart. The schematic rider has body parts as identified in the Reference Numerals/Indicia list. The angular positions of the ankle and knee joints of the schematic rider in FIG. 1 and all other drawing figs. remain fixed; i.e., lower leg 44 does not change angular position with respect to upper leg 46 or foot 42. Thus, the ankle and knee joints (not specifically identified in drawing figs.) do not flex in the CAD model. However, the schematic rider is free to pivot at schematic left hip joint 48L & schematic right hip joint 48R.

Additionally, the schematic rider is free to pivot about the virtual points of the conical projections under schematic left foot 42L and schematic right foot 42R, essentially at the interface with board 40. The schematic "T" & "V" torso 50, is free to pivot about an essentially vertical axis, though torso 50 is tilted slightly forward to simulate one of the most common rider postures. The central position between schematic hip joints 48 L&R (roughly the location of a living rider's center of gravity) is located essentially over the center of board 40. In FIG. 1 the schematic rider is facing straight ahead (neutral) without favor to a regular or goofy foot position/body posture, i.e. the schematic rider is facing a side of board 40.

Figure 2:
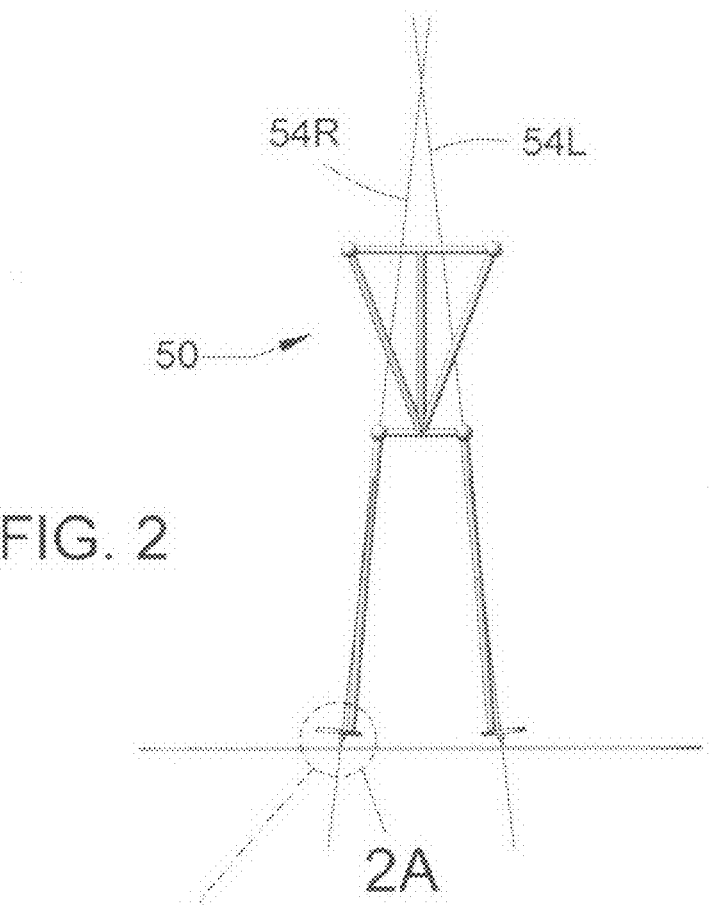
FIGS. 2 & 2A are front views of a schematic sportboard & rider; facing neutral.

Shown in FIG. 2 is the schematic rider and sportboard with the same rider posture as in FIG. 1, although now in a model front view. Thus, the schematic rider is facing toward the observer of FIG. 2. This view is perpendicular to the long edges of board 40. Two virtual axes are illustrated: schematic left foot-hip axis 54L & schematic right foot-hip axis 54R. These axes pass through the virtual points of the conic projections under feet 42 L&R and hip joints 48 L&R. As can be seen in FIG. 2, the intersection of axes 54 L&R is significantly above torso 50 forming an acute angle.

Figure 2A:
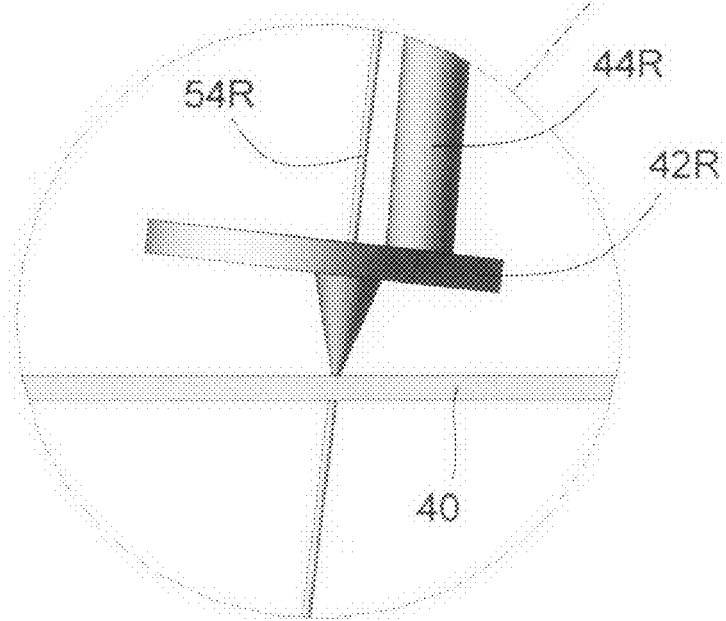

FIG. 2A shows a close-up, detail view of foot 42R and sportboard 40. In FIG. 2A, the angular position of foot 42R relative to board 40 should be considered. Since the view of board 40 reveals no top or bottom surfaces; it is thus virtually horizontal in the reference frame of the CAD model: Also, essentially just the edges of foot 42R are visible; thus, the theoretical long axis (not labeled in drawing figs.) of foot 42R is close to being parallel to an axis (not illustrated) coming out of the view toward the observer. However, foot 42R is seen to be tilted relative to the longest dimension of board 40. That is, foot 42R in the left side of the FIG. 2A is further from board 40 than in the right side of FIG. 2A. This angle is essentially a horizontal projection of the profiles of board 40 and foot 42R. By virtue of symmetry, the observer can determine that the same angular relationship (albeit mirrored) exists between board 40 and foot 42L.

Figure 3:
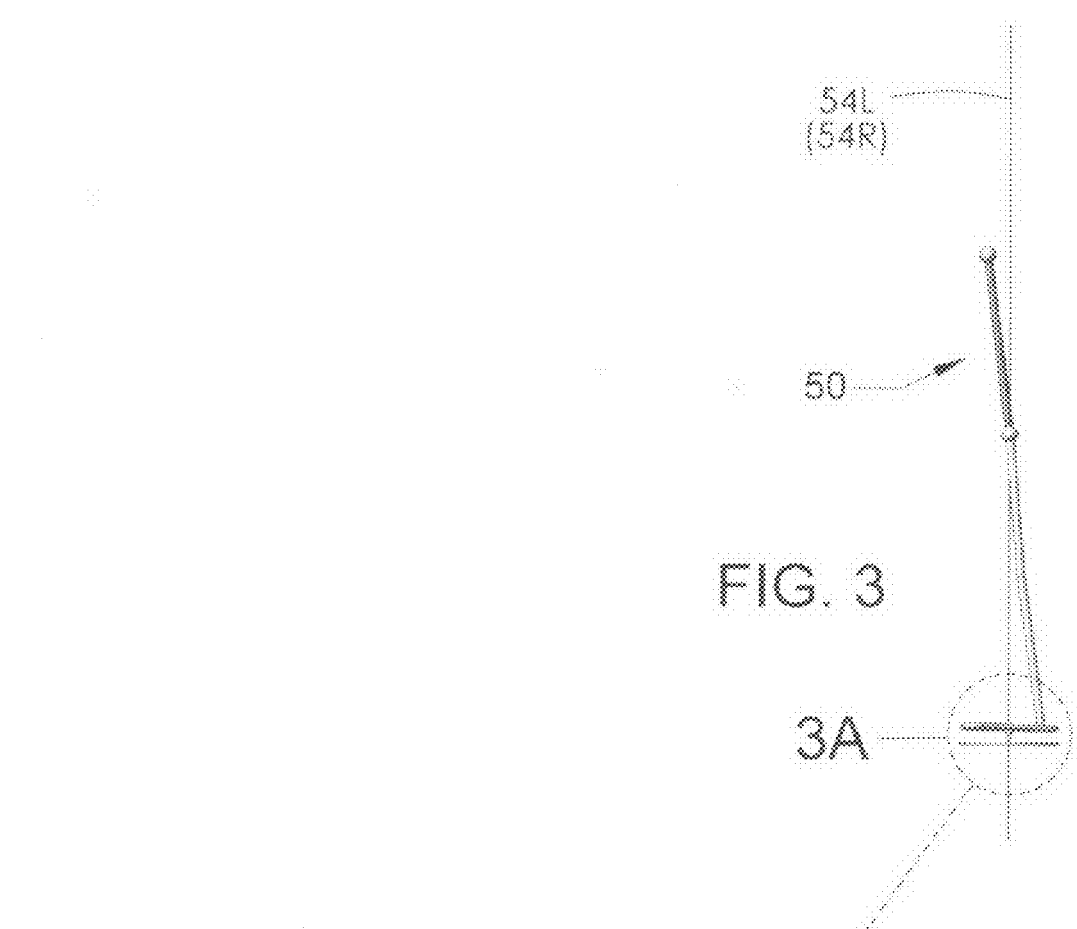
FIGS. 3 & 3A are side views of a schematic sportboard & rider; facing neutral.

Shown in FIG. 3 is the schematic rider & sportboard with the same rider posture as FIGS. 1 & 2, but in a model right side view, i.e., as viewing the schematic model of FIG. 2 from the right side of the drawing. As can be seen in FIG. 3, axes 54 L&R (54R behind 54L) are essentially vertical and coplanar; thus, sharing a plane that is perpendicular to the observer's view in FIG. 3. The posture of the schematic rider is also of note; the schematic rider is tilted slightly forward with legs slightly bent at the knees. Also, the schematic rider's virtual center of gravity (living human equivalent) is essentially positioned over the center of board 40.

Figure 3A:
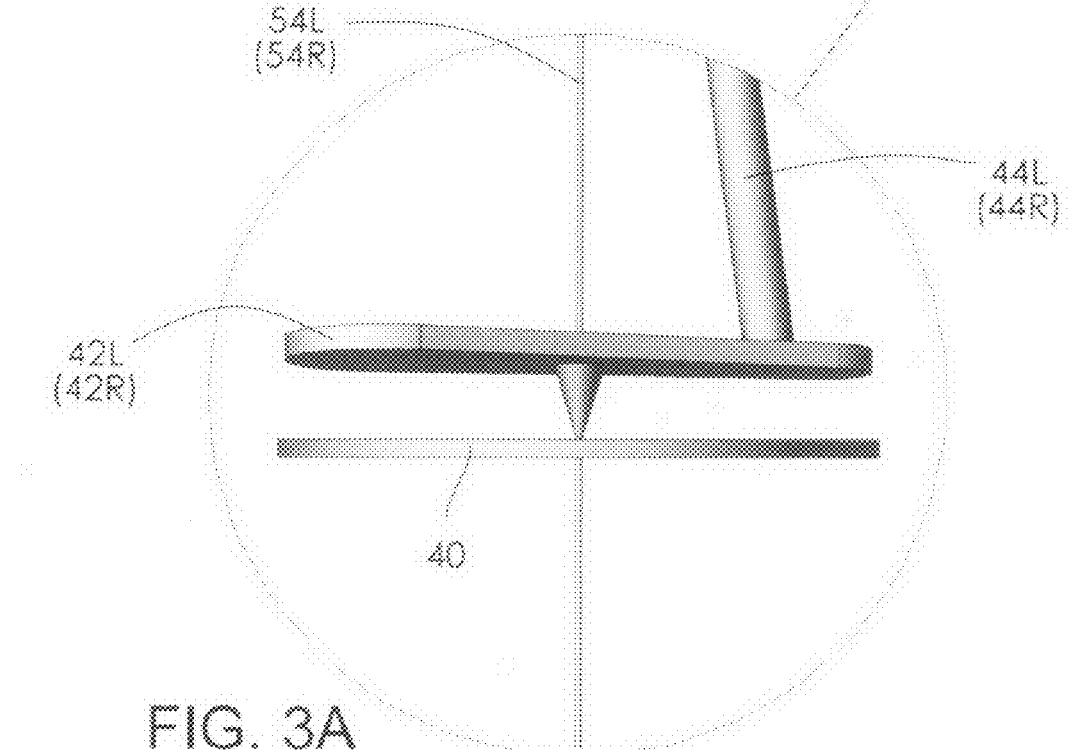

FIG. 3A shows a close-up, detail view of foot 42L (42R behind 42L) and axis 54L (54R behind 54L). As in FIGS. 2, 2A,-& 3, board 40 is again virtually horizontal in the reference frame of the CAD model. The angular relationship of foot 42L is to be noted in this view. The observer should note the angular orientation of feet 42 R&L relative to board 40 in the views of FIG. 3A, utilizing FIGS. 2 & 2A for reference.

Detailed Description—FIGS. 4, 5, 5A, 5B, 6, & 6A—Schematic Model

FIGS. 4, 5, 5A, 5B, 6, & 6A are all images of the same schematic rider & sportboard, shown in the same positional orientation. However, the figures show different drawing views of the same schematic model orientation.

Figure 4:
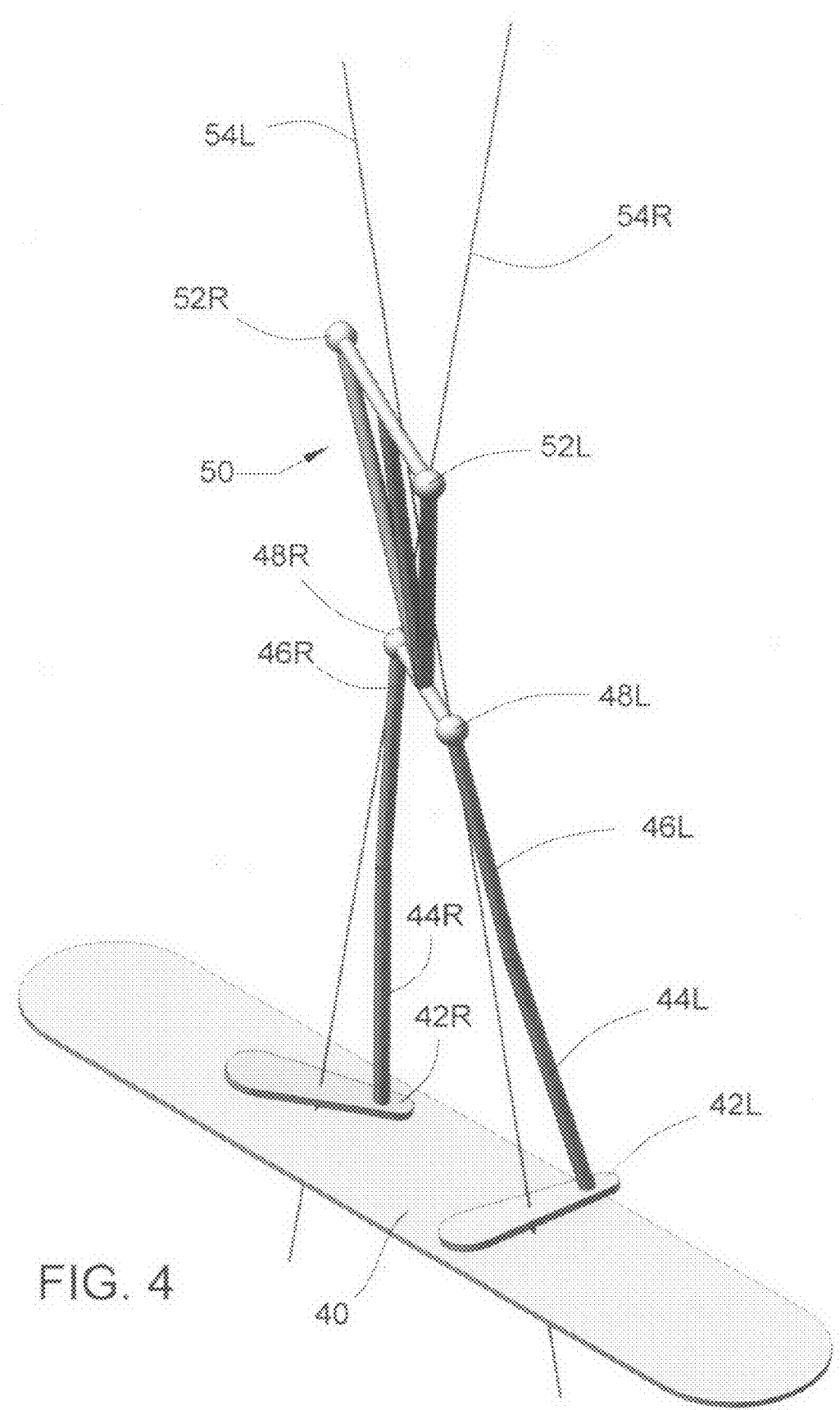
FIG. 4 is an isometric view of a schematic sportboard & rider; positioned 'goofy'.

FIG. 4 shows an isometric view of the schematic rider and board 40. This drawing view direction of the schematic model is essentially the same as FIG. 1. However, in FIG. 4 (and in FIGS. 5, 5A, 5B, 6, & 6A) the schematic rider is facing both to the side of board 40 as well as to the schematic rider's (virtual) right. This is essentially a goofy posture illustration. Axes 54 L&R are shown displaced from the positions shown in FIG. 1, as follows from the new orientation/posture of the schematic model. As can be seen in FIG. 4, torso 50 and feet 42 R&L (and related schematic body members) have all been rotated as commensurate with a living rider's body.

FIG. 5 shows a model front view of the schematic rider and board 40; this is basically the same view orientation as in FIG. 2. However, as can be seen by inspection of FIG. 5, axes 54 L&R now intersect at a point much closer to torso 50. This is in contrast with the intersection of axes 54 L&R in FIG. 2. This change follows from the rotation of torso 50, which simulates the natural motion of a living rider's torso as turned generally to face the direction of travel.

FIG. 5A shows a close-up, detail view of foot 42R and sportboard 40. This is essentially the same drawing view orientation as shown in FIG. 2A. However, as can be seen by inspection of FIG. 5A, the angular orientation of foot 42R relative to board 40 is significantly different than that of FIG. 2A. As evident in FIG. 5A, the long axis of foot 42R is oriented significantly away from the axis perpendicular to (a.k.a. "coming out of the view toward") the observer. The toe portion (not labeled in drawings) of foot 42R is higher in elevation than the heel portion (not labeled in drawings) of foot 42R. Additionally, the bottom of foot 42R can be seen in FIG. 5A. Thus, in the in the view of FIG. 5A, the medial, or inside of foot 42R is further from board 40 than the lateral, or outside portion of foot 42R-. Also of note regarding FIG. 5A is the steeper profile angle between board 40 and foot 42R as compared to that shown in FIG. 2A. The profile angle seen in FIG. 5A is formed essentially by the horizontal projection of the profiles of board 40 and foot 42R. This observation is true for this comparison regardless if the projection angle is made by using any of the following portions of foot 42R: one of the lateral edges, the (theoretical) long axis, or one of the medial edges.

FIG. 5B is a close-up, detail view of foot 42L and sportboard 40. This view shows the angular relationship of foot 42L relative to board 40. As in FIG. 5A, the toe portion of the foot of FIG. 5B (foot 42L) is pointed, in part, toward the schematic rider's right side. Thus, as can be seen in FIG. 5B, the long axis of foot 42L is oriented significantly away from the axis perpendicular to the view of the observer. The toe portion of foot 42L is lower in elevation than the heel portion of foot 42L. Also, the top of foot 42L can be seen in FIG. 5B. Thus, in the view of FIG. 5B, the medial portion of foot 42L is further from board 40 than the lateral portion of foot 42L. Also of note regarding FIG. 5B is the steeper profile angle between board 40 and foot 42L as compared to that shown in the lower right portion of FIG. 2—(essentially the mirror image of FIG. 2A).

Shown in FIG. 6 is a model right side view, i.e., as viewing the schematic model from the right side of FIG. 5; that is, looking toward the schematic model. This also is essentially the same drawing view angle as seen in FIG. 3. As can be seen in FIG. 6, axes 54L & 54R are no longer substantially vertical, nor are they coplanar as compared to the positions of FIG. 3. In FIG. 6, axes 54R & 54L are each tilted away from the plane they shared in FIG. 3; 54L is tilted somewhat to the observer's left hand side and 54R is tilted to the right.

FIG. 6A is a detail view of the schematic rider's feet and board 40 shown in FIG. 6. As can be seen in FIG. 6A, both the bottom portion of foot 42L and the top portion of foot 42R are visible. The toe portion of foot 42L is lower than the heel portion of foot 42L; the heel portion of foot 42R is lower than the toe portion of foot 42R.

To summarize certain aspects of FIGS. 1 through 6A, they:
Are drawing views of the same schematic rider and sportboard,
Show the schematic rider in two different postures, and,
Show rider foot positions that are "idealized". Put differently, the schematic rider essentially illustrates the more natural foot positions that a living rider's physical body will take preferentially.

Detailed Description—FIGS. 7, 8, 8A, 8B, 9, 9A, 10, 11, 11A, 11B, 12, & 12A—Schematic Model FIGS. 7 through 12A for the most part correlate with FIGS. 1 through 6A, in the sense that the same schematic rider and sport board is shown in essentially the same postures for corresponding drawing views. However, FIG. 8B has been added for clarity and FIG. 11B does not directly correlate with FIG. 5B. Additionally, several schematic items are added to the schematic model, which are visible in the drawing views. The additional items are:
56L schematic left support tilt base,
56R schematic right support tilt base,
58L schematic left rotational tilt base, and,
58R schematic right rotational tilt base.

FIG. 7 correlates with FIG. 1 in the sense of schematic rider posture and drawing view. Support bases 56 (L&R) in FIG. 7, are static elements that represent/establish tilted support platforms for rotational bases 58 (L&R), which are dynamic. Rotational bases 58 (L&R) are constrained to rotate about their respective area centroids at the interface between themselves and support bases 56 (R&L). Thus, board 40, support bases 56 (L&R), and rotational bases 58 (L&R), are essentially dynamic, independent sub-systems of the CAD schematic model. However, in the schematic model, rotational bases 58 (L&R) also are constrained to index with (rotate by an equivalent angular amount) the rotation of feet 42 (L&R). Rotational bases 58 (L&R) represent a theoretical, dynamic, support platform for feet 42 (R&L). However, for analysis and graphical purposes, rotational bases 58 (R&L) are displaced away from the respective bottoms of feet 42 (R&L). Board 40, axes 54 (L&R), feet 42 (L&R), and all other body elements of the schematic rider thus constitute a different, dynamic, sub-system from rotational bases 58 (L&R). The gaps between rotational bases 58 (R&L) and feet 42 (R&L) indicate the relative angular alignment of these items in the schematic model. Thus, these gaps enable the measurement any angular misalignment in the schematic model throughout the schematic rider's range of motion. Such gaps are not readily visible in FIG. 7, though they are present.

FIG. 8 is essentially the same drawing view angle of the schematic model as in FIG. 2. The posture of the schematic rider is also essentially the same for both figures.

FIG. 8A shares essentially the same view of the schematic model as FIG. 2A; the schematic rider is in essentially the same posture for both figures. The observer should take note of the parallelism that is visible between foot 42R and rotational base 58R in FIG. 8A.

FIG. 8B is a partial, cross sectional, detail view as indicated in FIG. 8. Of particular note is the parallelism visible between foot 42L and rotational base 58L.

FIG. 9 is a side view of the schematic rider and board 40, which can be compared with FIG. 3.

FIG. 9A is a detail view of the schematic model that correlates with FIG. 3A.

FIG. 10 is a view of the schematic model that correlates with FIG. 4 regarding drawing view angle and posture of the schematic rider.

FIG. 11 correlates with FIG. 5 regarding drawing view angle and the posture of the schematic rider.

FIG. 11A correlates with FIG. 5A for drawing view and schematic rider posture. However, in FIG. 11A the gap between rotational base 58R and foot 42R is visible. For the observer of FIG. 11A, the bottom of foot 42R is visible; the top portion of rotational base 58R is not visible. This results from the fact that these two surfaces are essentially parallel.

FIG. 11B is a partial, cross sectional, detail view as indicated in FIG. 11. Thus, FIG. 11B does not closely correlate with the drawing view angle of FIG. 5B. The observer of FIG. 11B should also note that the bottom surface of foot 42L is essentially parallel to the top surface of rotational base 58L.

FIG. 12 correlates with FIG. 6 for drawing view and schematic rider posture.

FIG. 12A correlates with FIG. 6A for drawing view and schematic rider posture.

Detailed Description—Overview of FIGS. 1-12, Introduction of FIG. 13—Schematic Model FIGS. 1 through 6A essentially illustrate certain natural, preferred, foot orientations of the human body for two postures while riding a sportboard. FIGS. 7 through 12A essentially illustrate the same riding postures and foot orientations as FIGS. 1-6A, albeit with the addition of schematic support tilt bases 56 (R&L) and schematic rotational tilt bases 58 (R&L). The presence of support bases 56 (R&L) serve analytically and graphically to represent the presence of tilted axes of rotation for a rider's respective feet. The tilted axes of rotation are present in foot/boot binding embodiments of the present application. The presence of rotational bases 58 (R&L) serve analytically and graphically to represent the presence of tilted, planar, support surfaces for the respective bottoms of a rider's feet. The tilted, planar, support surfaces are each tilted relative to a plane that is perpendicular to a respective (tilted) axis of rotation. The tilted planar support surfaces are schematically representative of foot or boot binding embodiments of the present application. The relationship of support bases 56 (R&L) and rotational bases 58 (R&L) with respect to each other and board 40 are further illustrated in FIG. 13.

Shown in FIG. 13 are: board 40, support base 56 (R/L), and rotational base 58 (R/L). Added to the schematic model are schematic sportboard normal vector 60, schematic support tilt base perpendicular axis 62, and schematic rotational tilt base normal vector 64. Sportboard normal vector 60 is normal/perpendicular to sportboard 40 and is positioned for convenience adjacent to support base 56 (L/R). Support base axis 62 is perpendicular to the top planar surface of support base 56 (L/R) and has been positioned at the centroid of area of the bottom surface of rotational base 58 (L/R). Positioned in this way, support axis 62 also represents the rotational axis for rotational base 58 (L/R). Normal vector 64 is perpendicular to the top planar surface of rotational base 58 (L/R) and has been modeled/shown shorter in length for illustrative purposes. Additionally, normal vector 64 is located away from the area centroid of the top planar surface of rotational base 58 (L/R) for clarity. The angle formed between sportboard normal vector 60 and support base axis 62 is illustrated as "a". The angle formed between support base axis 62 and normal vector 64 is illustrated as "φ".

Detailed Description—FIGS. 14A, 14B, 15, 16, 16, 17, 18, 19, 20A, 20B, 21A, & 21B—Embodiments FIGS. 14A through 21B are not drawing views of a schematic model but are drawings of embodiments of the present application.

FIGS. 14A & 14B show a sportboard equipped with embodiments of the present application shown in two general operational configurations found in the prior art, i.e., independent foot rotation vs. connected foot rotation. FIG. 14A shows sportboard 66 with two instances of tilt base assembly, free 68. FIG. 14B shows sportboard 66 with two instances of tilt base assembly, connected 70.

FIG. 15 shows sportboard 66 with two instances of connected assembly 70. One instance is an exploded assembly shown in FIG. 16, the other is assembled and has one part identified as: tilted rotating plate, right hand, connected 86RC.

FIG. 16 shows a close up of the exploded view as indicated in FIG. 15. Tilted base plate, connected 72C is shown attached to sportboard 66 by a plurality of fasteners, one of which is visible in FIG. 16 and is identified as screw 80. Each instance of screw 80 affixes base plate 72C via tilted base plate, fastener hole feature 73H, one of which is identified in FIG. 16. Tilted base plate, bearing raceway feature 73H is visible on base plate 72C, and receives a plurality of ball bearing(s) 84, one of which is shown in FIG. 16. Two of tilted base plate, stop feature 73S are shown in FIG. 16 (one is labeled) as an integral portion of base plate 72C; stop feature 73S provides limits for the rotation of tilted rotating plate, left hand, connected 86LC. Rotating plate 86LC has nut 82 (one shown in FIG. 16) attached/embedded to receive threaded fasteners (not shown) to affix a boot binding (not shown) to tilted rotating plate, top surface 87T. A common fastener hole pattern found in the prior art is shown in rotating plate 86LC. O-ring 88 is shown positioned between rotating plate 86LC and cover, connected 90C. Cover 90C is pressed onto base plate 72C or has epoxy or adhesive (not shown in the drawing figures) as a fastening means. Ancillary drive features that are used for rotational cooperation between adjacent base assemblies 70 are shown in FIG. 16: cable housing 74, cable 76, and cable end 78. The ancillary drive features used for rotational cooperation are not shown in detail but are of the prior art.

FIG. 17 shows sportboard 66 with two instances of free assembly 68. One instance is an exploded assembly shown in FIG. 18, the other is assembled and has one part identified as: tilted rotating plate, right hand, free 86RF.

FIG. 18 correlates closely with FIG. 16; essentially the difference is in the operational configurations. Absent from FIG. 18 are the ancillary drive features that are shown in FIG. 16. Thus, FIG. 18 shows tilted base plate, free 72F, tilted rotating plate, left hand, free 86LF, and cover 90F, with slight differences from the versions of those comparable parts shown in FIG. 16.

FIG. 19 shows a modified isometric view of the underside of three components: base plate 72F, rotating plate 86RF, and cover 90F. These components are spaced apart in a manner similar to an incomplete assembly that has been exploded. Additionally, tilted rotating plate, stop feature 87S is shown as an integral part of rotating plate 86RF.

FIG. 20A displays a top view of the three components shown in FIG. 19. However, the components are shown positioned adjacently as they would be when assembled. For the most part, only rotating plate 86RF and cover 90F are visible in FIG. 20A; base plate 72F is mostly hidden.

FIG. 20B is a cross sectional view of the three components identified in FIGS. 19 & 20A. The view section line for FIG. 20B originates in FIG. 20A. A tilted rotating plate, bearing raceway feature 87B is shown as an integral part of rotating plate 86RF. Bearing raceway 87B receives ball bearing 84 (not shown in FIG. 20A) and shares it with bearing raceway 73B, which is integral to base plate 72F. Also shown as an integral feature of rotating plate 86RF is tilted rotating plate, o-ring groove feature 87G, which receives o-ring 88 (not visible in FIG. 20A).

FIG. 21A is similar to FIG. 20A in that it shows the same three components in essentially the same view direction. FIG. 21A indicates a view direction for the cross sectional view of FIG. 21B.

FIG. 21B is a cross sectional view of base plate 72F, rotating plate 86RF, and cover 90 via the view direction indicated in FIG. 21A. Certain component features of interest are identified in FIG. 21B.

The materials used for the manufacture of the components shown in FIGS. 14A through 21B are of the types found in the prior art. The materials used for base plate 72 and rotating plate 86 can be made from any of the available thermoplastics or thermosets also sometimes referred to as engineering polymers (with or without reinforcement). For example: nylon, Nylon 6/6, Zytel® ST, acetal, PEEK, polycarbonate, and others, such as are readily available and listed on websites such as the "IDES" website www.ides.com. Base plate 72 and rotating plate 86 can also be made of composite materials such as fiberglass, carbon fiber composites including nanomaterials, aramid fiber composites, plastic-metal composites, etc. Base plate 72 and rotating plate 86 can also be made of lightweight metals such as the various alloys of aluminum or magnesium. Ball bearings 84, when utilized, are of the type found in the prior art and can be used with or without a cage. Cover 90 can be made of the same materials as base plate 72 and rotating plate 86; or alternatively, cover 90 can be made of thin wall sheet metal such as stainless or titanium, or of the available aluminum or magnesium alloys. Additionally, any of the available rapid prototyping or rapid manufacturing (a.k.a. additive process) materials can be used.

Sportboard 66 can be of typical prior art construction, having embedded fastener insert patterns utilized to attach base plate 72. Unique fastener insert patterns that are engineered specifically for base plate 72 can also be utilized. The fasteners and inserts are typically metal, but can be of any available type capable of carrying the applied loads. Additionally, the fastening means by which base assemblies 68/70 are attached may include a variety of mechanical means and/or epoxies, adhesives, adhesive tapes such as 3M™ VHB™ Tape. Additionally, when assemblies 68/70 are embedded within a sportboard, the components are thereby intrinsically fastened and retained, and that new sportboard will then become an article other than that which is now known in the prior art.

Detailed Description—Operation—FIGS. 1-13—
Schematic Model

The schematic CAD model shown in FIGS. 1-13 simulates the preferred movement of a simplified human skeletal structure relative to board 40. The schematic rider structure (virtual human rider) is shown in two postures with associated relative foot positions in the various drawing figures: 1) an essentially 'neutral' position, and 2) an essentially 'goofy' position. The schematic rider is a 'sub-system' of the schematic CAD model and is capable of essentially an infinite range of motions between these two positions. Additionally, a duplicate, infinite series of complimentary, 'mirrored' positions moving toward a 'regular' riding position are available for the CAD model. The schematic rider portion of the CAD model is constrained to move in an idealized manner that is more akin to a 'stress neutral' orientation of the schematic rider's lower legs—especially the ankle joint. When the schematic rider is moved from one posture to another, foot-hip axes 54 (L&R) sweep through space making respective, conic-like patterns. Thus, a virtual point of one of the conic-like surface patterns made by the schematic rider is established by one of the respective virtual intersections of axes 54 (L&R) with board 40. A virtual, radial arc of one of the conic-like surface patterns is made by the motion of the respective intersection points of axes 54 (L&R) and hip joints 48 (L&R). Thus, a virtual axis about which the conic-like patterns are swept is determined by the idealized schematic rider's motion. However, the virtual axis established by the motion of axes 54 (L&R) is not illustrated in FIGS. 1-12A.

The schematic CAD model has 'sub-systems' (shown in FIGS. 7-12A) to analyze the motion of the schematic rider of the schematic CAD model. The sub-systems are basically comprised of support base 56 (L&R) and rotational base 58 (L&R). These schematic components essentially simulate the motion of embodiments of this present application. In addition to FIGS. 1-12A, FIG. 13 is also to be referenced with regard to the virtual motion of a typical foot or boot binding embodiment of this application. Tilt base normal vector 64 emanates from, and is perpendicular to, the top planar surface of rotational base 58 (L&R). The rotation of rotational base 58 (L&R) causes base vector 64 to sweep through a conical-like surface pattern. The motion of base vector 64 corresponds to respective axes 54 (L&R), if base vector 64 is located in the center of rotational base 58 (L&R). (Base vector 64 is shown offset from the center of rotational base 58 (L&R) for clarity.) No drawing of this application shows normal vector 64 together with either of axes 54 (L&R). Additionally, the virtual axis established by the conical sweep motion of axes 54 (L&R) of the schematic rider corresponds essentially to tilt base axis 62. Tilt base axis 62 is normal to the top surface of support base 56 (L&R) and represents the axis of rotation of rotational base 58 (L&R). The above description of the operation of the schematic CAD model is true for correctly chosen angles of $\alpha$ and $\phi$.

A simplified physical prototype model enabling a human rider (of approx. 180 cm in height) to assume the rider postures shown in the embodiments of FIGS. 1-12A was made and tested. The foot supports of the physical prototype pivoted freely, thus enabling a full range of postures, from regular to goofy and an infinite number of positions between. The physical prototype components were adjustable with regard to angles $\alpha$ and $\phi$. The physical prototype and Jiving human 'rider' did not traverse along the earth, water, or other medium during this testing. However, the rider assumed different sportboard riding postures with freely pivoting foot/boot supports. The physical prototype was iteratively tested and adjusted until optimal/ideal performance was evident. The measure of optimal performance in testing was the absence of flexure of the ankle joint. This was determined by the perception of the rider and observers. The solution arrived at for the position of physical components included the measure of approx. 8 degrees for $\alpha$ and approx. 4 degrees for $\phi$ (re: FIG. 13 and summary). These same angular values were tested and worked properly for humans of three different heights –170 cm, 180 cm, and 188 cm. However, the foot center stance distances were not the same for all three riders.

Subsequent to the building and testing of the simplified physical prototype, the schematic CAD model shown in FIGS. 1-13 was created. The dimensional values used to create skeletal system for the schematic rider were those of the 180 cm height human that initially tested the physical prototype. The CAD model was then iteratively solved via computer to obtain schematic components which were parallel to within 1 degree (as described earlier in this application) throughout the range of 'neutral' to 'goofy' postures. This resulted in component geometry/configurations reflecting the measure of approx. 12 degrees for $\alpha$ and approx. 5 degrees for $\phi$. The components shown in FIGS. 14-21 B were subsequently created and modeled, based upon the results of both the simplified physical prototype and schematic CAD models.

That a single angular solution set (same values of $\alpha$ and $\phi$) for the physical prototype worked well with three different riders was very encouraging. The physical prototype was solved first using the 180 cm tall rider. The schematic CAD model was subsequently solved for the same 180 cm tall rider's body dimensions, albeit with greater precision. The physical prototype was subsequently adjusted to match the angular values used in the schematic model and retested. When tested, it also resulted in no perception of ankle joint flexure. The difference between the angular values arrived at initially via the physical prototype vs. those of the schematic CAD model reveal one side ('the lower half') of a tolerance zone that is available. Thus, in general, it is evident that a common configuration (angular solution set) of the embodiments disclosed will work for essentially all riders.

Detailed Description—Operation—FIGS. 14-21B—
Embodiments

When rotating plate 86 is rotated relative to base plate 72, the support surface for a rider's foot or boot intrinsically maintains the preferred posture of the rider. This is accomplished due to the angular solution set of base plate 72 and top surface 87T of rotating plate 86 and their respective positioning. The (left foot & right foot) rotational axes established intrinsically by respective bearing raceways 73B are arranged to intersect essentially above the centroid of a symmetrical sportboard. This also is substantially located above a rider's center of gravity and the center point between hip joints. Testing of one embodiment indicates that if the intersection of the rotational axes is shifted somewhat to the rear or to the front of the rider slightly, there is no perceptible change in performance.

Top surface 87T is designed to be tilted with respect to a rotational axis of bearing raceway 73B. Thus, a surface normal vector of top surface 87T may be coplanar with, but is otherwise angled to, the rotational axis of a respective bearing raceway 73B. Since rotating plates 86 are dynamic, the initial, starting, neutral position for top surfaces 87T is important. Rotating plates 86 are essentially oriented such that the upper portion ('upper' with respect to a plane normal to rotational axis of 73B) of top surface 87T is generally located under the medial portion (below the instep) of a rider's foot. This essentially creates an intersection of the respective surface normal vectors of top surfaces 87T, generally located above the center of the sportboard. Testing of one embodiment indicates that shifting the intersection of the surface normal vectors of top surface 87T somewhat to the front or to the rear of a rider produces no perceptible degradation in performance.

Thus, with the angular solution set for values of $\alpha$ and $\phi$, the intersection of the rotational axes of 73B, and the surface normal vectors of top surface 87T, a zone of tolerance exists.

Put differently, there is a 'sweet spot' of overlap for the defining parameters for the geometry of embodiments disclosed. This is akin to the sweet spot (portion of surface area) on the face of a tennis racket that provides desirable performance. The sweet spot for the embodiments disclosed herein is not a physical, planar region in the same sense as a tennis racket. It is comparative in the graphical sense with regard to defining numerical parameters. The precise limits of the sweet spot/tolerance zone are likely subjective since they are related to rider perception. However, the knowledge obtained in analysis directs one to utilize the central portion(s) of the sweet spot/tolerance zone; this is obtainable at least by the methods described earlier.

For the embodiments shown in FIGS. 14-21B, rotating plate 86 is limited in its rotational movement relative to base plate 72. This is accomplished via stop feature 87S, which is limited to travel between respective stop features 73S, which are integral elements of base plate 72. Ball bearings 84, which operate within bearing raceway features 73B (in base plate 72) and 87B (in rotating plate 86), enable greater rotational freedom of rotating plate 86. O-ring 88 provides isolation from the outside environment for ball bearings 84 and the respective raceways within which they roll. The geometry, material type, and surface finish, of o-ring 88, rotating plate 86, and cover 90, can be chosen to provide rotational resistance as well as environmental isolation/control, as desired.

Detailed Description—Conclusion, Ramifications, and Scope

Accordingly, the reader will see that the embodiments revealed provide an improved foot binding or boot binding or binding mounting system for use with a sportboard, such as a snowboard, wakeboard, mountainboard, kiteboard, or similar article. The embodiments disclosed herein provide a sportboard rider with the ability to continuously change his or her foot positions and posture. Further, the embodiments disclosed herein provide for more natural and comfortable foot, leg, and body positions and postures than with articles of the prior art. This eliminates stress on a rider's body structure and tissues and enables better control of the sportboard. Thus, a more ergonomically correct body connection to a sportboard is established. This preferable body connection is present for positions between, inclusive of, and beyond—the typical, static regular and goofy foot stances. Additionally, the reader will see other advantages provided over the prior art:

- Hard shell type boots or more rigid foot mounts with greater ankle support can be more easily used for general riding such as freestyle or freeride type snowboarding if desired,
- Wearing soft shell boots a rider can more freely move to other, more exotic postures on a sportboard,
- Embodiments disclosed intrinsically provide lift for a rider's feet; this eliminates toe and heel drag, for which intermediary devices have been manufactured and used in the prior art,
- The typical foot positions of regular and goofy can be extended to further extremes, more akin to some of the more aggressive foot positions and postures used in GS (giant slalom) sportboarding. The typical positions required for the more common (static) regular and goofy positions arguably, have been a compromise to accommodate fakie (backwards from main position) riding, which is no longer necessary with the embodiments of this present application.

Although the description above includes many specificities, these should not be construed as limiting the scope of the embodiments disclosed. The embodiments shown illustrate only some of the configurations for the physical construction of an Ergonomically Advanced Rotating Boot & Foot Mounting System for Sportboards. For example, variations of embodiment include but are not limited to the following:

- Base plate 72 can be formed as an integral portion of the laminate structure (composite matrix) of sportboard 66, either of the same material as the sportboard core or as a separate material added to the matrix, thereby becoming an integral part of the matrix and forming a unique, new type of sportboard;
- The means of fastening base plate 72 to sportboard 66 can include dampening materials such as elastomers or other compliant materials;
- Base plate 72 can have integral legs or separate stanchions or other leg-type-riser features to minimize mass and/or optimize structural properties;
- In lieu of (or in conjunction with) cover 90, assemblies 68 or 70 can be embedded within the composite structure of sportboard 66, thereby making rotating plate 86 an integral (albeit dynamic) portion of the sportboard;
- Cover 90 can be eliminated if an integral portion of base plate 72 (such as a formed flange feature) performing the same functions is utilized;
- Rotating plate 86 can be manufactured with an integral foot or boot mount, e.g., plate 86 can have foot or boot receiving surface & restraint features such as foot or boot straps & high back plate;
- A molded in foot form can be included as an integral feature of, or as a discrete part mounted to, top surface 87T of rotating plate 86. For example, top surface 87T can be other than a flat, planar shaped surface. Thus, top surface can be a complex surface shape that provides the correct predetermined angular alignment of a rider's foot relative to a respective axis of rotation;
- Top surface 87T can actually be oriented perpendicular to the axis of rotation of rotating plate 86—but if and only if some other means to tilt the foot is included. The included means then serves to augment the (incorrect at 90 deg.) angular measure of top surface 87T. One example is a foot or boot mount (a.k.a. binding) that has bottom and top surfaces tilted with respect to each other—thus resulting in a predetermined angular tilt of a support surface for a rider's foot or boot. In a second example, boot soles can be provided that have a predetermined angular tilt. Such boots can then utilize clip-on boot 'sole caps' that would be used for walking when disconnected from the sportboard. The sole caps thus correct & counter the boot sole's tilt (i.e., make a rider's foot parallel with the ground) and can further include ancillary features that improve walking;
- Rotating plate 86 and/or base plate 72 can be manufactured with a relatively large hole or void in the central region, thus being essentially annular (a.k.a. tubular or hollow-cylindrical) in shape for optimization. With an annular shape, top surface 87T thus provides support generally underneath the principal support regions of the foot, i.e., top surface 87T supports the ball and heel portions of the foot;
- When rotating plate 86 is annular shaped, top surface 87T can include means for attaching a foot or boot binding closer to bearing raceway 87B. For example, the typical fastener hole pattern of rotating plates 86 as illustrated, can be modified such that the holes are displaced significantly outward, close to or above bearing raceway 87B;
- Rotating plate 86 can have integral foot or boot attachment means as well as an annular shaped lower portion;

Antifriction type bearings (ball, needle, roller, etc.) are not required for correct operation when materials are utilized that have appropriate surface finishes & coefficients of friction. An example is a PTFE or similar material thrust bearing that can be used in lieu of ball or roller bearings, with or without lubricants such as dry film, graphite, oil, grease, etc.;

Surface plating/treatments can be added to the surfaces of base plate 72 and/or rotating plate 86 to improve performance;

Rotational locks that prevent rotation of rotating plate 86 can be employed such as are known in the prior art;

Fixed, integral rotational stops that limit rotation of rotating plate 86 have been illustrated, but adjustable stops can be employed;

O-ring 88 is mentioned as being utilized (optionally) to provide rotational resistance—other means to provide rotational resistance can be used;

A sealing element such as o-ring 88 is not required for embodiments designed accordingly;

One of the embodiments shown includes the use of foot/boot mounting system components connected by a rotary transmission means known in prior art. Many other means are available to provide rotary transmission for cooperative foot positioning;

Sportboard 66 can include standard fastener patterns such as are found in the prior art or other means of attaching to base assemblies 68 and 70 can be utilized. Fastening may include mechanical fasteners, epoxies, adhesives, adhesive tapes—with foam or other substrates, etc;

Sportboard 66 can be modified with assemblies 68 or 70 such that it is part of a ride simulator or exercise equipment for training or entertainment.

Thus, the scope of the embodiments disclosed should be determined by the appended claims and their legal equivalents, rather than the examples provided.

I claim:

1. A sportboard comprising:
   a. a board body having a longitudinal axis and a substantially planar midsection;
   b. a left foot mounting assembly comprising:
      i. a left base plate comprised of a left bottom surface joined to the board body and a left top surface tilted at a first rightward acute angle with respect to the left bottom surface; and
      ii. a left rotatable plate comprised of a left lower surface pivotably in contact with the left top surface of the left base plate, and a left upper surface tilted at a first leftward acute angle with respect to the left lower surface, the left rotatable plate being rotatable from a neutral position clockwise and counterclockwise with respect to the left base plate; and
   c. a right foot mounting assembly comprising:
      i. a right base plate comprised of a right bottom surface joined to the board body and a right top surface tilted at a second leftward acute angle with respect to the right bottom surface; and
      ii. a right rotatable plate comprised of a right lower surface pivotably in contact with the right top surface of the right base plate, and a right upper surface tilted at a second rightward acute angle with respect to the right lower surface, the right rotatable plate being rotatable from a neutral position clockwise and counterclockwise with respect to the right base plate;
   wherein the first rightward acute angle of the left base plate is substantially larger in magnitude than the first leftward acute angle of the left rotatable plate and the second leftward acute angle of the right base plate is substantially larger in magnitude than the second rightward acute angle of the right rotatable plate such that when the left rotatable plate and the right rotatable plate are in their respective neutral positions, the left upper surface of the left rotatable plate is tilted rightwardly in the direction of the longitudinal axis of the board body at an angle equal to the difference between the first rightward acute angle and the first leftward acute angle, and the right upper surface of the right rotatable plate is tilted leftwardly in the direction of the longitudinal axis of the board body at an angle equal to the difference between the second leftward acute angle and the second rightward acute angle.

2. The sportboard of claim 1, wherein the first rightward acute angle is equal to the second leftward acute angle, and the first leftward acute angle is equal to the second rightward acute angle.

3. The sportboard of claim 2, wherein the first rightward acute angle is between about 8 and about 16 degrees and the first leftward acute angle is between about 4 and about 6 degrees.

4. The sportboard of claim 3, wherein the first rightward acute angle is about 10 degrees and the first leftward acute angle is about 5 degrees.

5. The sportboard of claim 1, wherein the left base plate and the right base plate are joined to the board body with fasteners.

6. The sportboard of claim 1, wherein the left base plate and the right base plate are joined to the board body with adhesive.

7. The sportboard of claim 1, wherein the left bottom surface of the left base plate and the right bottom surface of the right base plate are embedded in the board body.

8. The sportboard of claim 1, wherein the left base plate and the right base plate are integrally formed as part of the board body.

9. The sportboard of claim 1, further comprising means for coupling the rotation of the left rotatable plate and the right rotatable plate.

10. The sportboard of claim 9, wherein when the left rotatable plate is in its neutral position, the right rotatable plate is in its neutral position.

11. The sportboard of claim 1, wherein the clockwise rotation of the left rotatable plate is limited by a clockwise stop on the left base plate, the counterclockwise rotation of the left rotatable plate is limited by a counterclockwise stop on the left base plate, the clockwise rotation of the right rotatable plate is limited by a clockwise stop on the right base plate, and the counterclockwise rotation of the right rotatable plate is limited by a counterclockwise stop on the right base plate.

12. The sportboard of claim 1, further comprising a left bearing disposed between the left base plate and the left rotatable plate, and a right bearing disposed between the right base plate and the right rotatable plate.

13. The sportboard of claim 12, further comprising a left cover enclosing a portion of the left base plate and the left rotatable plate, and a right cover enclosing a portion of the right base plate and the right rotatable plate.

14. The sportboard of claim 13, further comprising a left seal disposed between the left cover and the left rotatable plate, and a right seal disposed between the right cover and the right rotatable plate.

15. The sportboard of claim 1, further comprising a left boot mounting feature formed on the left rotatable plate, and a right boot mounting feature formed on the right rotatable plate.

16. A foot mounting system for a sportboard comprising a board body having a longitudinal axis and a substantially planar midsection, the system comprising:

a. a left foot mounting assembly comprising:
   i. a left base plate comprised of a left bottom surface joinable to the board body and a left top surface tilted at a first rightward acute angle with respect to the left bottom surface;
   ii. a left rotatable plate comprised of a left lower surface pivotably in contact with the left top surface of the left base plate, and a left upper surface tilted at a first leftward acute angle with respect to the left lower surface, the left rotatable plate being rotatable from a neutral position clockwise and counterclockwise with respect to the left base plate; and b. a right foot mounting assembly comprising:
   i. a right base plate comprised of a right bottom surface joinable to the board body and a right top surface tilted at a second leftward acute angle with respect to the right bottom surface;
   ii. a right rotatable plate comprised of a right lower surface pivotably in contact with the right top surface of the right base plate, and a right upper surface tilted at a second rightward acute angle with respect to the right lower surface, the right rotatable plate being rotatable from a neutral position clockwise and counterclockwise with respect to the right base plate;

wherein the first leftward acute angle of the left rotatable plate is substantially smaller in magnitude than the first rightward acute angle of the left base plate and the second rightward acute angle of the right rotatable plate is substantially smaller in magnitude than the second leftward acute angle of the right base plate and wherein when the left base plate lower surface and the right base plate lower surface are joined to the substantially planar midsection of the board body such that the left base plate and right base plate are in alignment with the longitudinal axis of the board body, and when the left rotatable plate and the right rotatable plate are in their respective neutral positions, the left upper surface of the left rotatable plate is tilted rightwardly in the direction of the longitudinal axis of the board body at an angle equal to the difference between the first rightward acute angle and the first leftward acute angle, and the right upper surface of the right rotatable plate is tilted leftwardly in the direction of the longitudinal axis of the board body at an angle equal to the difference between the second leftward acute angle and the second rightward acute angle.

* * * * *